(12) United States Patent
Klasen-Memmer et al.

(10) Patent No.: US 8,399,073 B2
(45) Date of Patent: Mar. 19, 2013

(54) LIQUID-CRYSTAL MEDIUM

(75) Inventors: Melanie Klasen-Memmer, Heuchelheim (DE); Matthias Bremer, Darmstadt (DE); Konstantin Schneider, Bad Camberg (DE); Detlef Pauluth, Ober-Ramstadt (DE)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 0 days.

(21) Appl. No.: 13/141,132

(22) PCT Filed: Dec. 17, 2009

(86) PCT No.: PCT/EP2009/009079
§ 371 (c)(1),
(2), (4) Date: Jun. 21, 2011

(87) PCT Pub. No.: WO2010/072370
PCT Pub. Date: Jul. 1, 2010

(65) Prior Publication Data
US 2011/0248216 A1 Oct. 13, 2011

(30) Foreign Application Priority Data
Dec. 22, 2008 (DE) .......... 10 2008 064 171

(51) Int. Cl.
C09K 19/30 (2006.01)
C09K 19/12 (2006.01)
C09K 19/34 (2006.01)
C09K 19/32 (2006.01)
C09K 19/20 (2006.01)

(52) U.S. Cl. .......... 428/1.1; 252/299.61; 252/299.62; 252/299.63; 252/299.66; 252/299.67

(58) Field of Classification Search .......... 428/1.1; 252/299.61, 299.62, 299.63, 299.66, 299.67
See application file for complete search history.

(56) References Cited

U.S. PATENT DOCUMENTS

| | | | |
|---|---|---|---|
| 5,384,065 | A | 1/1995 | Geelhaar et al. |
| 6,066,268 | A | 5/2000 | Ichinose et al. |
| 6,514,580 | B2 | 2/2003 | Heckmeier et al. |
| 7,767,280 | B2 | 8/2010 | Klasen-Memmer et al. |
| 2001/0010366 | A1 | 8/2001 | Heckmeier et al. |
| 2003/0222245 | A1* | 12/2003 | Klasen-Memmer et al. .......... 252/299.66 |
| 2005/0230661 | A1 | 10/2005 | Hattori et al. |
| 2006/0198967 | A1 | 9/2006 | Saito et al. |
| 2006/0198968 | A1 | 9/2006 | Goto et al. |
| 2008/0011984 | A1 | 1/2008 | Fujita et al. |
| 2008/0191167 | A1 | 8/2008 | Klasen-Memmer et al. |
| 2008/0273160 | A1 | 11/2008 | Kim et al. |
| 2008/0308768 | A1* | 12/2008 | Klasen-Memmer et al. .......... 252/299.61 |
| 2010/0102275 | A1 | 4/2010 | Klasen-Memmer et al. |
| 2010/0243958 | A1 | 9/2010 | Klasen-Memmer et al. |
| 2011/0193020 | A1* | 8/2011 | Klasen-Memmer et al. .......... 252/299.61 |

FOREIGN PATENT DOCUMENTS

| | | |
|---|---|---|
| EP | 0474062 A2 | 3/1992 |
| EP | 1106671 A2 | 6/2001 |
| EP | 1958999 A1 | 8/2008 |
| JP | 11228966 A | 8/1999 |
| JP | 11236567 A | 8/1999 |

OTHER PUBLICATIONS

World IP Organization. International Search Report. PCT/EP2009/009079, Applicant: Merck Patent GMBH, Mailed: Mar. 19, 2010.
ESPACENET. "English Abstract—Liquid Crystal Medium". JP 11228966 A, Applicant: Merck Patent GMBH, Aug. 24, 1999.
ESPACENET. "English Abstract—Liquid Crystal Medium". JP 11236567 A, Applicant: Merck Patent GMBH, Aug. 31, 1999.

* cited by examiner

*Primary Examiner* — Shean C Wu
(74) *Attorney, Agent, or Firm* — Millen, White, Zelano & Branigan, P.C.

(57) ABSTRACT

The invention relates to a liquid-crystalline medium having negative dielectric anisotropy which comprises at least one compound of the formula I

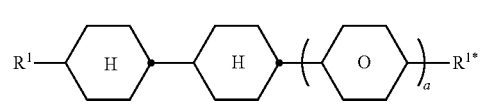

in which
$R^1$, $R^{1*}$ and a have the meanings indicated in Claim 1, and to the use thereof for an active-matrix display, in particular based on the VA, PS-VA, PALC, FFS or IPS effect.

14 Claims, No Drawings

LIQUID-CRYSTAL MEDIUM

The invention relates to a liquid-crystalline medium having negative dielectric anisotropy which comprises at least one compound of the formula I

in which
R$^1$ and R$^{1*}$ each, independently of one another, denote an alkyl radical having 1-6 C atoms, and
a denotes 0 or 1.

Media of this type can be used, in particular, for electro-optical displays having active-matrix addressing based on the ECB effect and for IPS (in-plane switching) displays or FFS (fringe field switching) displays.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\epsilon \leqq -0.5$ in order to be suitable for use in high-information display elements based on the ECB effect. Electro-optical display elements based on the ECB effect have a homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yea, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays disclosed hitherto usually operate as TN cells with crossed polarisers in transmission and are back-lit.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

The disadvantages of the MLC-TN displays disclosed hitherto are their comparatively low contrast, the relatively high viewing-angle dependence and the difficulty in producing grey shades in these displays.

There thus continues to be a great demand for MLC displays having very high specific resistance at the same time as a large working-temperature range, short response times and a low threshold voltage with the aid of which various grey shades can be produced.

For television applications in particular, it is very important to achieve short response times. In order to achieve this, the dielectrically neutral compounds used in ECB or VA applications are, in particular, compounds of the formulae

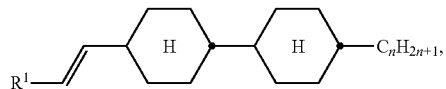

where $R^1$=H or $CH_3$

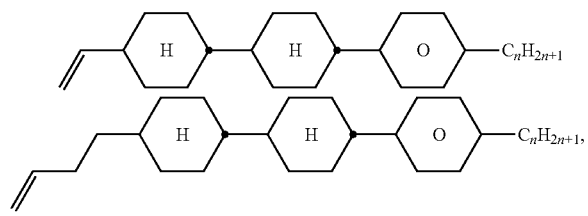

since these are distinguished by particularly low rotational viscosities and very good solubilities.

In LCD television applications, reliability problems frequently occur, such as, for example, image sticking, i.e. apparent "burning-in" of the image if the display has been addressed over an extended time.

This problem frequently only occurs after extended operating times of the television sets. The cause is frequently regarded as being the long exposure time to the backlight at the same time as increased operating temperatures, which can result in still unexplained processes in the display, for example an interaction between alignment layer and a liquid-crystal mixture. On the pad of the liquid-crystal mixture, the cause of the occurrence of image sticking problems is regarded as being the neutral alkenyl compounds frequently used, which are, for example, mentioned above.

The invention is based on the object of providing liquid-crystal mixtures, in particular for monitor and TV applications, which are based on the ECB effect or on the IPS or FFS effect, which do not have the above-mentioned disadvantages or only do so to a reduced extent. In particular, it must be ensured for monitors and televisions that they also operate at extremely high and extremely low temperatures and at the same time have short response times and at the same time have improved reliability behaviour, in particular have no or significantly reduced image sticking after long operating times.

Surprisingly, it has now been found that this object can be achieved if nematic liquid-crystal mixtures which comprise at least one compound of the formula I

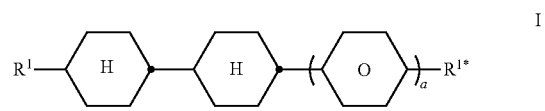

in which
$R^1$ and $R^{1*}$ each, independently of one another, denote an alkyl radical having 1 to 6 C atoms, and
a denotes 0 or 1,
are used in these display elements.

The use of the compounds of the formula I in VA mixtures is known, for example, from EP 0 474 062 B1, U.S. Pat. No. 6,066,268, JP H11-228966, JP H11-236567, EP 1 106 671 B1, U.S. 2005/0230661.

In contrast to the prior art, the negative dielectric anisotropy mixture concept according to the invention is distinguished by short response times at the same time as good low-temperature stability, in spite of the absence of neutral alkenyl compounds.

The invention thus relates to a liquid-crystalline medium which comprises at least one compound of the formula I.

The mixtures according to the invention preferably exhibit very broad sematic phase ranges having clearing points $\geq 60°$ C., preferably $\geq 65°$ C., in particular $\geq 70°$ C., very favourable values for the capacitive threshold, relatively high values for the holding ratio and at the same time very good low-temperature stabilities at $-30°$ C. and $-40°$ C., as well as very low rotational viscosities and short response times. The mixtures according to the invention are furthermore distinguished by the fact that, in addition to the improvement in the rotational viscosity $\gamma_1$, an increase in the elastic constants $K_{33}$ for improving the response times is observed, and they exhibit improved reliability behaviour.

Some preferred embodiments of the mixtures according to the invention are indicated below:
a) $R^1$ and $R^{1*}$ in the formula I denote straight-chain alkyl, in particular $C_2H_5$, n-$C_3H_7$, n-$C_4H_9$, furthermore n-$C_5H_{11}$, n-$C_6H_{13}$. Particularly preferably, $R^1$ denotes n-$C_3H_7$ and $R^{1*}$ denotes $CH_3$, $C_2H_5$ or n-$C_3H_7$.
b) Liquid-crystalline medium which comprises one, two, three, four or more, preferably one, two or three, compounds of the formula I.
c) Liquid-crystalline medium in which the proportion of compounds of the formula I in the mixture as a whole is $\geq 3\%$ by weight, preferably $\geq 10\%$ by weight, particularly preferably $\geq 15\%$ by weight. Particular preference is given to liquid-crystalline media which comprise 3-50%, preferably 25-35%, of one or more compounds of the formula I. Compounds of the formula I where a=0 are preferably present in the mixture in amounts of 15-35%. Compounds of the formula I where a=1 are preferably present in the mixture in amounts of 3-30%.

d) Preferred compounds of the formula I are the compounds of the formulae I-1 to I-6:

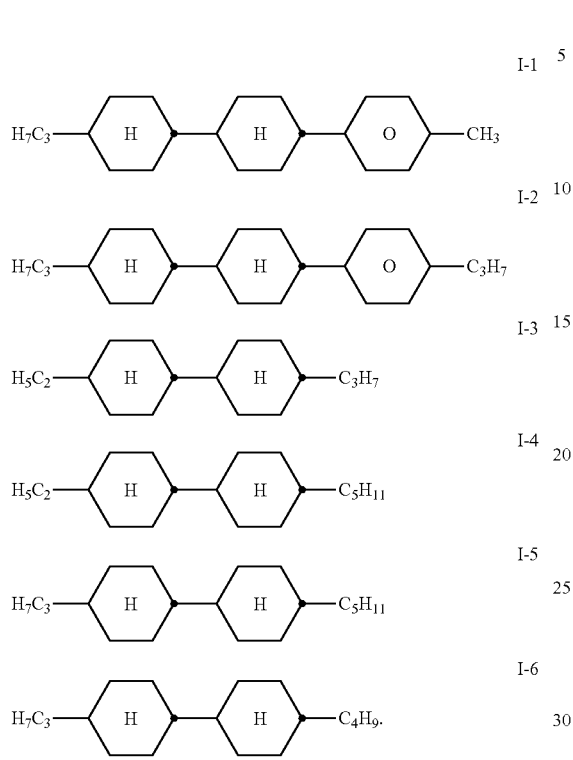

Mixtures according to the invention preferably comprise the compounds of the formulae I-1 and/or I-2, preferably in amounts of 5-30%.

The medium according to the invention particularly preferably comprises the tricyclic compounds of the formula I-1 and/or of the formula I-2 in combination with one or more bicyclic compounds of the formulae I-3 to I-6. The total proportion of the compounds of the formulae I-1 and/or I-2 in combination with one or more compounds selected from the bicyclic compounds of the formulae I-3 to I-6 is preferably 5-40%, very particularly preferably 15-35%.

Very particularly preferred mixtures comprise the compounds I-1 and I-3:

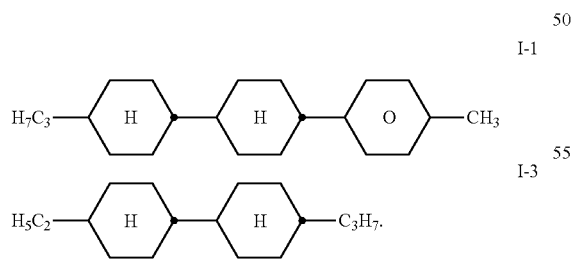

The compounds I-1 and I-3 are preferably present in the mixture in a concentration of 15-35%, particularly preferably 15-25% and especially preferably 18-22%, based on the mixture as a whole.

Very particularly preferred mixtures comprise the compounds I-2 and I-3:

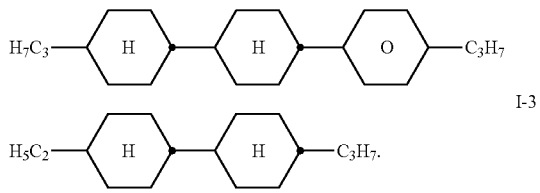

The compounds I-2 and I-3 are preferably present in the mixture in a concentration of 15-35%, particularly preferably 15-25% and especially preferably 18-22%, based on the mixture as a whole.

Very particularly preferred mixtures comprise the following three compounds:

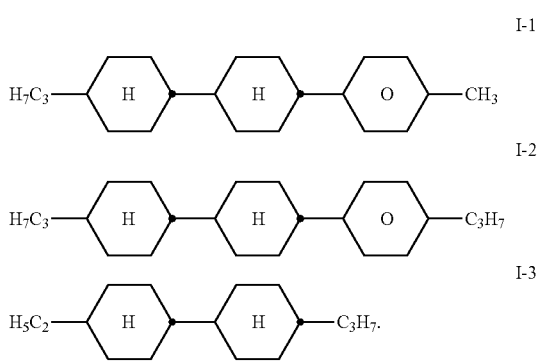

The compounds I-1, I-2 and I-3 are preferably present in the mixture in a concentration of 15-35%, particularly preferably 15-25% and especially preferably 18-22%, based on the mixture as a whole.

e) Liquid-crystalline medium which additionally comprises one or more compounds selected from the group of the compounds of the formulae IIA, IIB and IIC:

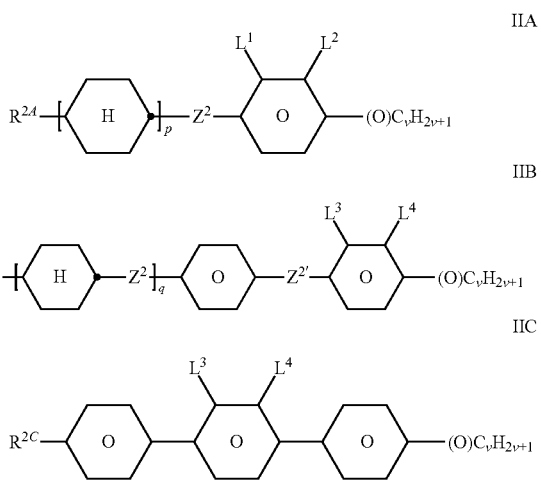

in which $R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more CH$_2$ groups in these radicals may be replaced by —O—, —S—,

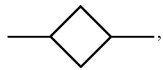

—C≡C—, —CF$_2$O—, —OCF$_2$—, —OC—O— or —O—CO— in such a way that O atoms are not linked directly to one another, L$^{1-4}$ each, independently of one another, denote F or Cl, Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—, p denotes 1 or 2,
q denotes 0 or 1, and
v denotes 1 to 6.

In the compounds of the formulae IIA and IIB, Z$^2$ may have identical or different meanings. In the compounds of the formula IIB, Z$^2$ and Z$^{2'}$ may have identical or different meanings.

In the compounds of the formulae IIA, IIB and IIC, R$^{2A}$, R$^{2B}$ and R$^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIA and IIB, L$^1$, L$^2$, L$^3$ and L$^4$ preferably denote L$^1$=L$^2$=F and L$^3$=L$^4$=F, furthermore L$^1$=F and L$^2$=Cl, L$^1$=Cl and L$^2$=F, L$^3$=F and L$^4$=Cl, L$^3$=Cl and L$^4$=F. Z$^2$ and Z$^{2'}$ in the formulae IIA and IIB preferably each, independently of one another, denote a single bond, furthermore a —C$_2$H$_4$— bridge.

If in the formula IIB Z$^2$=—C$_2$H$_4$—, Z$^{2'}$ is preferably a single bond or, if Z$^{2'}$=—C$_2$H$_4$—, Z$^2$ is preferably a single bond. In the compounds of the formulae IIA and IIB, (O)C$_v$H$_{2v+1}$ preferably denotes OC$_v$H$_{2v+1}$, furthermore C$_v$H$_{2v+1}$. In the compounds of the formula IIC, (O)C$_v$H$_{2v+1}$ preferably denotes C$_v$H$_{2v+1}$. In the compounds of the formula IIC, L$^3$ and L$^4$ preferably each denote F.

Preferred compounds of the formulae IIA, IIB and IIC are indicated below:

IIA-1
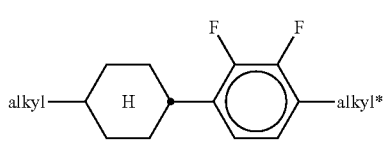

IIA-2
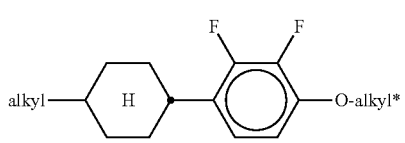

IIA-3
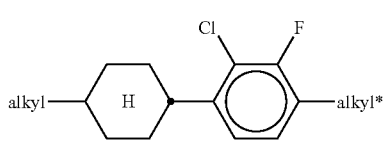

IIA-4
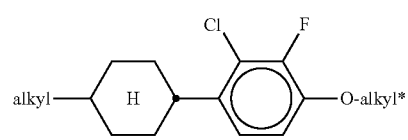

IIA-5
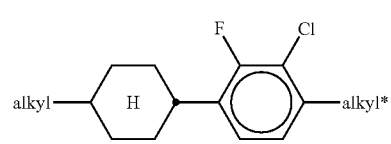

IIA-6
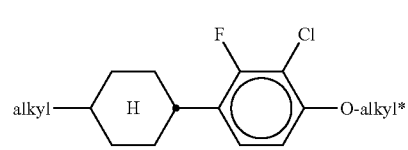

IIA-7
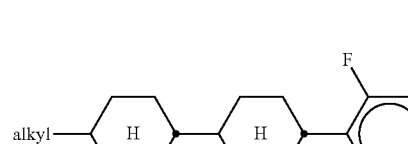

IIA-8
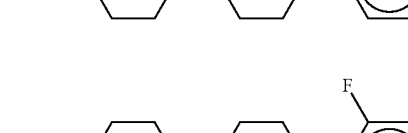

IIA-9
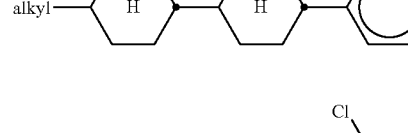

IIA-10
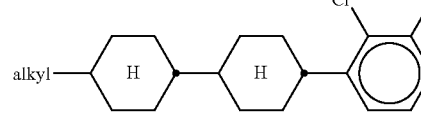

IIA-11
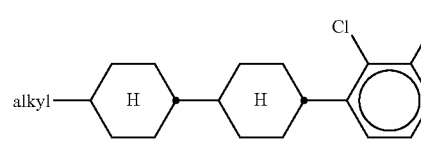

IIA-12
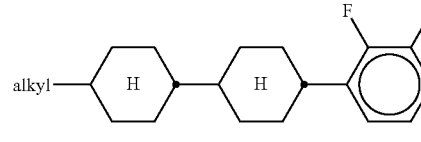

IIA-13
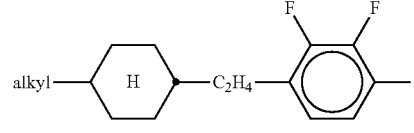

IIA-14 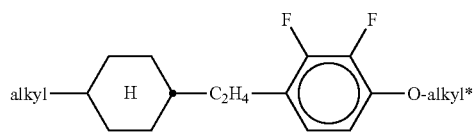
IIA-15 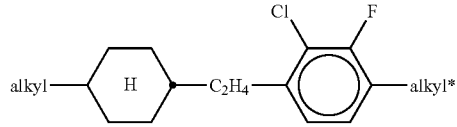
IIA-16 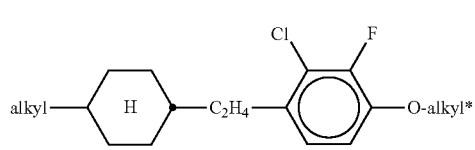
IIA-17 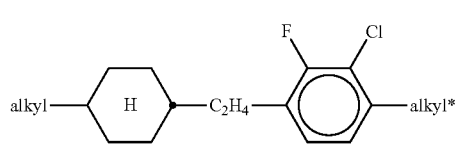
IIA-18 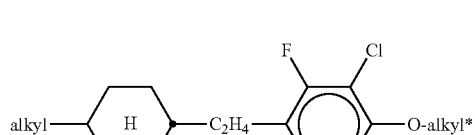
IIA-19 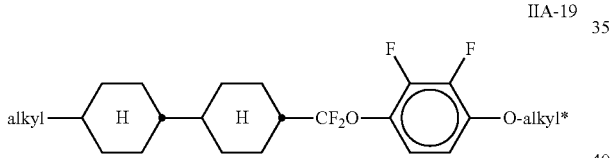
IIA-20 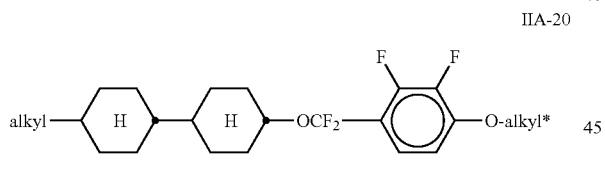
IIA-21 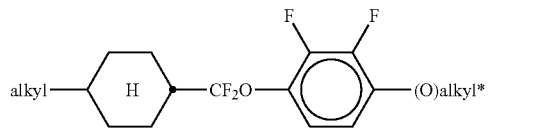
IIA-22 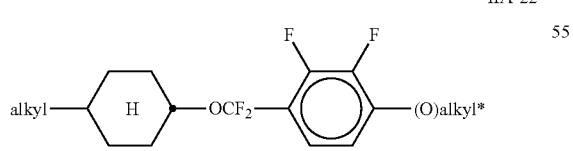
IIA-23 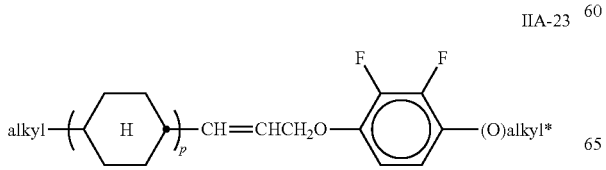
IIA-24 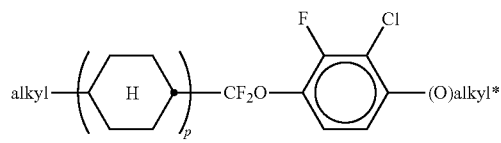
IIA-25 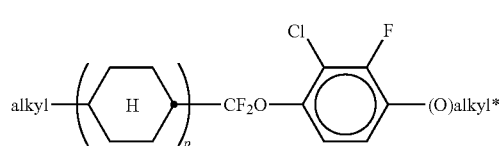
IIA-26 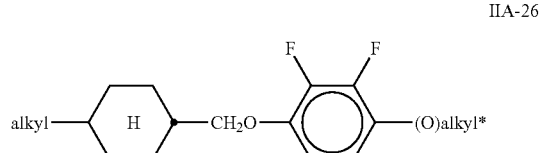
IIA-27 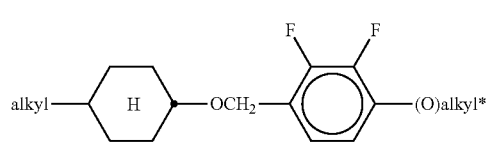
IIA-28 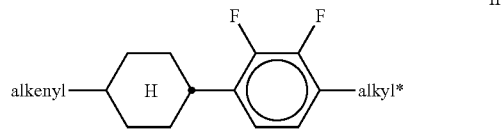
IIA-29 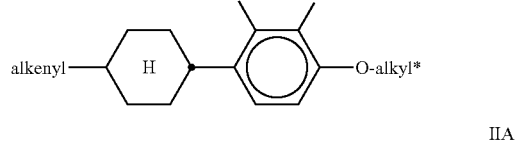
IIA-30 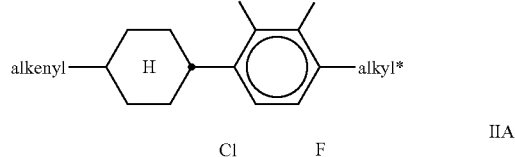
IIA-31 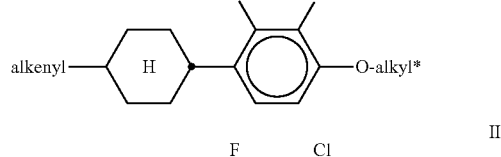
IIA-32 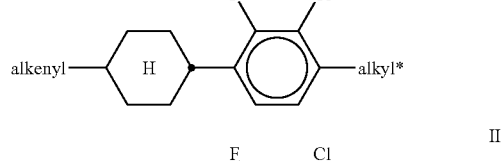
IIA-33 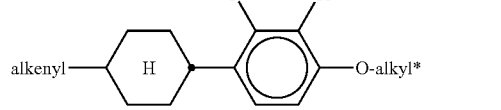

IIA-34
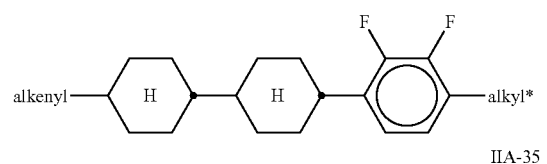
IIA-35
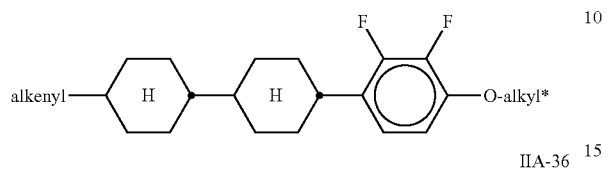
IIA-36
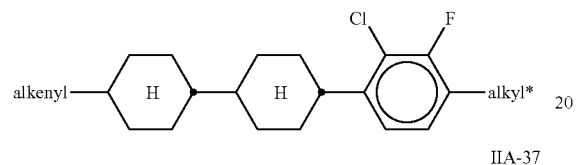
IIA-37
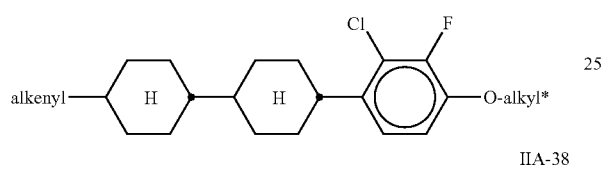
IIA-38
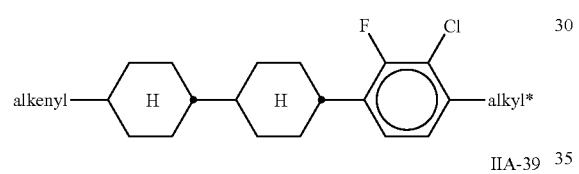
IIA-39
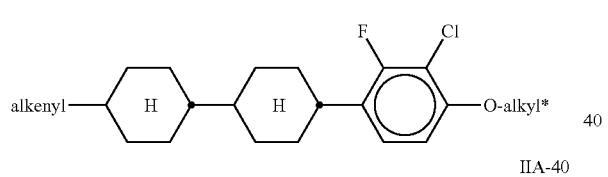
IIA-40
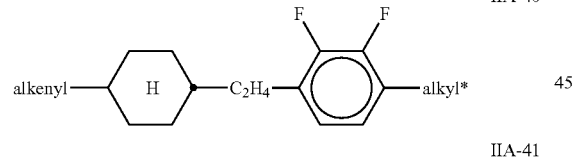
IIA-41
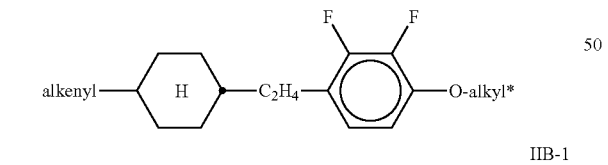
IIB-1
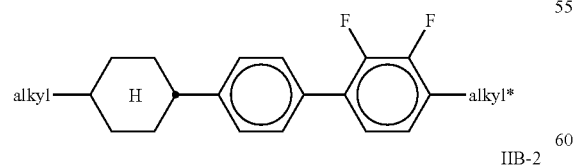
IIB-2
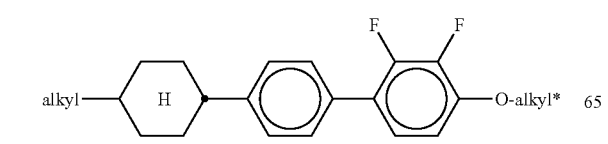
IIB-3
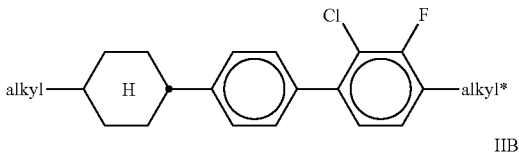
IIB-4
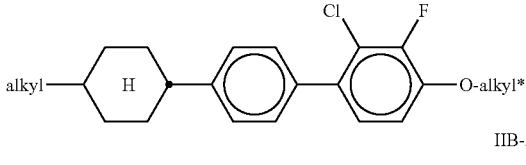
IIB-5
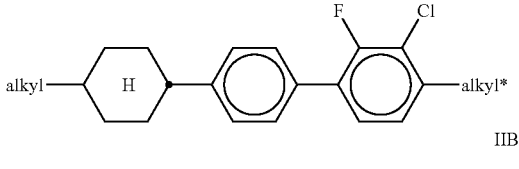
IIB-6
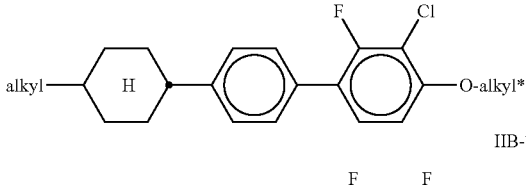
IIB-7
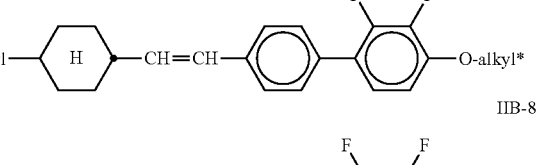
IIB-8
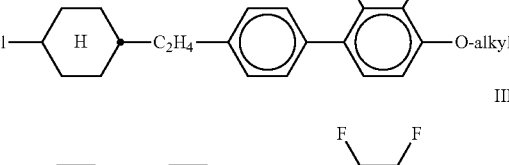
IIB-9
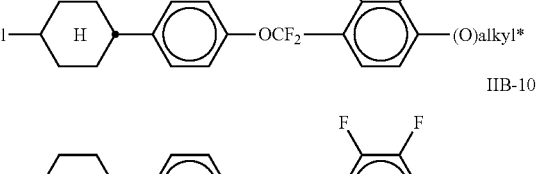
IIB-10
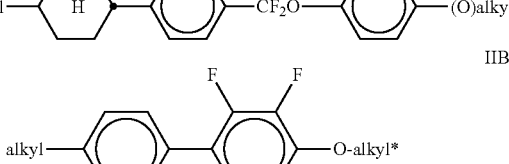
IIB-11
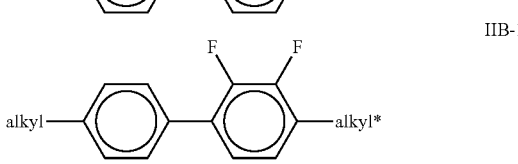
IIB-12
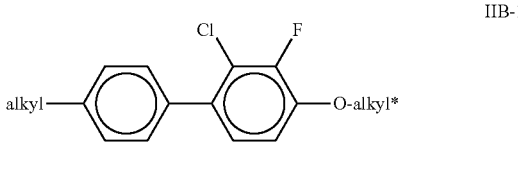
IIB-13

-continued

IIB-14 alkyl—⌬—⌬(F)(Cl)—O-alkyl*

IIB-15 alkenyl—⌬H—⌬—⌬(F,F)—alkyl*

IIB-16 alkenyl—⌬H—⌬—⌬(F,F)—O-alkyl*

IIC-1 alkyl—⌬(F,F)—⌬—⌬—alkyl*, in which alkyl and alkyl* each, independently of one another, denote a straight-chain alkyl radical having 1-6 C atoms.

Particularly preferred mixtures according to the invention comprise one or more compounds of the formulae IIA-2, IIA-8, IIA-14, IIA-29, IIA-35, IIB-2, IIB-11, IIB-16 and IIC-1.

The proportion of compounds of the formulae IIA and/or IIB in the mixture as a whole is preferably at least 20% by weight.

Particularly preferred media according to the invention comprise a compound of the formula IIC-1 alkyl—⌬O—⌬(F,F)—⌬O—alkyl*, in which alkyl and alkyl* have the meanings indicated above, preferably in amounts of >3% by weight, in particular >5% by weight and particularly preferably 5-25% by weight.

f) Liquid-crystalline medium which additionally comprises one or more compounds of the formula III

III

R³¹—⌬A—Z³—⌬H—R³² in which

R³¹ and R³² each, independently of one another, denote a straight-chain alkyl, alkoxyalkyl or alkoxy radical having up to 12 C atoms, and

⌬A denotes

⌬O , ⌬ , ⌬ ,

⌬O or ⌬O $Z^3$ denotes a single bond, —CH₂CH₂—, —CH=CH—, —CF₂O—, —OCF₂—, —CH₂O—, —OCH₂—, —COO—, —OCO—, —C₂F₄—, —C₄H₈—, —CF=CF—.

Preferred compounds of the formula III are indicated below:

IIIa alkyl—⌬H—⌬O—alkyl*

IIIb alkyl—⌬H—⌬O—O—alkyl*

IIIc alkyl—⌬H—⌬—alkyl*

IIId alkyl—⌬H—⌬—alkyl* in which
alkyl and
alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

g) Liquid-crystalline medium additionally comprising a compound of the formula

H₇C₃—⌬H—⌬H—CH=CH₂ and/or

H₉C₄—⌬H—⌬H—CH=CH₂ and/or

H₁₁C₅—⌬H—⌬H—CH=CH₂, preferably in total amounts of <20% by weight, in particular <10% by weight.

Preference is furthermore given to mixtures according to the invention comprising the compound

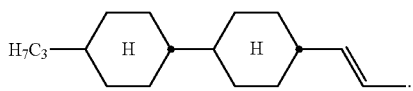

h) Liquid-crystalline medium which additionally comprises one or more tetracyclic compounds of the formulae

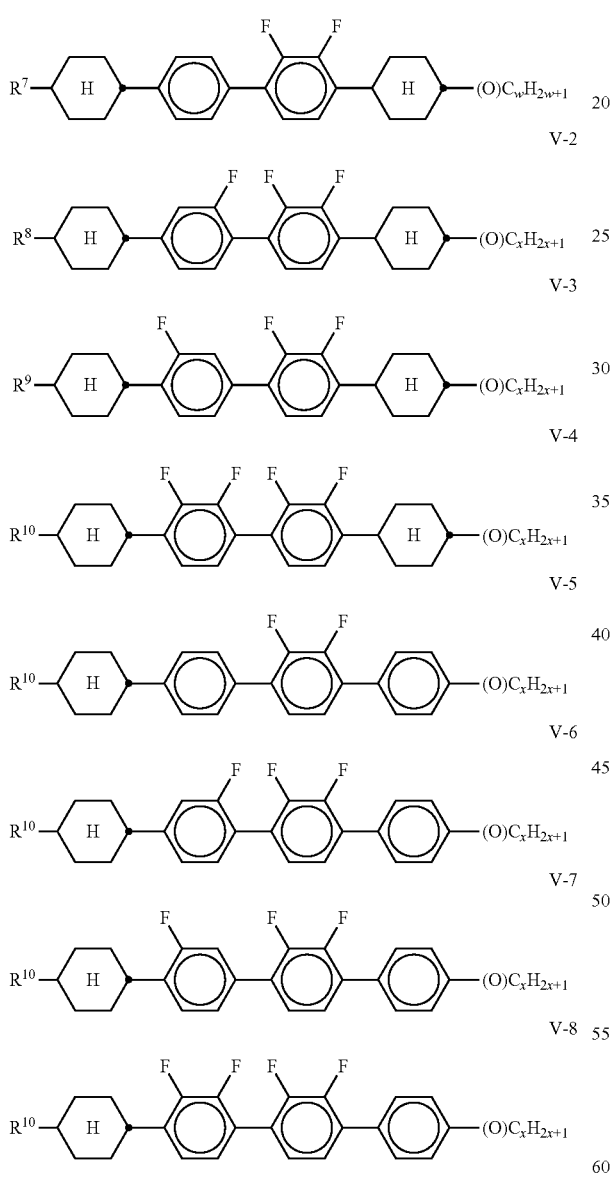

in which
R$^{7-10}$ each, independently of one another, have one of the meanings indicated for R$^{2,4}$ in Claim 2, and
w and x each, independently of one another, denote 1 to 6.

i) Liquid-crystalline medium which additionally comprises one or more compounds of the formulae Y-1 to Y-6:

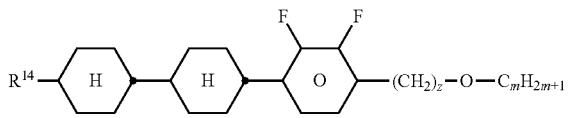

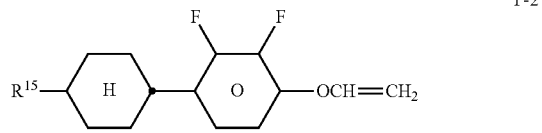

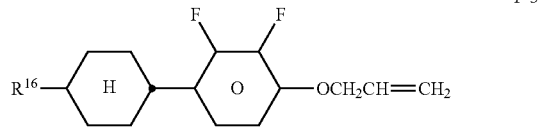

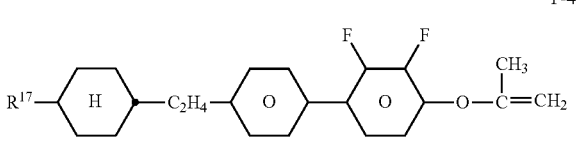

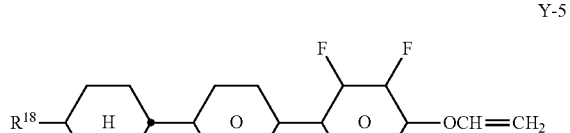

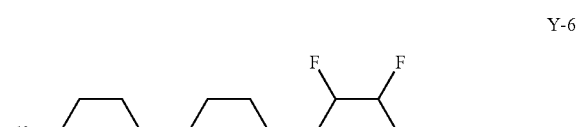

in which R$^{14}$-R$^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formula Y-1, preferably in amounts of ≧5% by weight.

j) Liquid-crystalline medium additionally comprising one or more fluorinated terphenyls of the formulae T-1 to T-20:

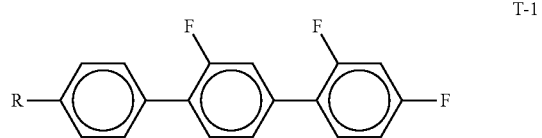

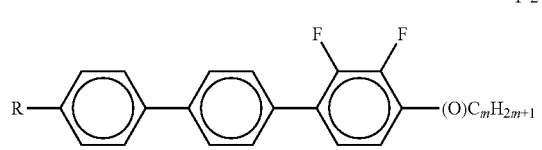

-continued

T-3
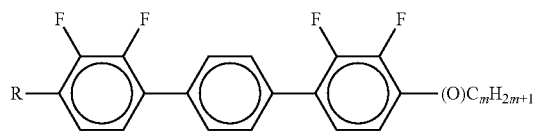

T-4
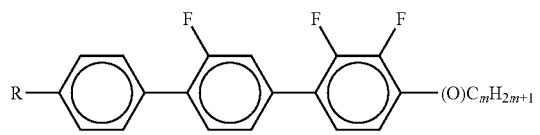

T-5
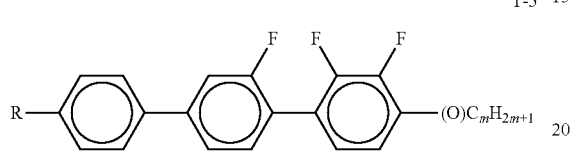

T-6
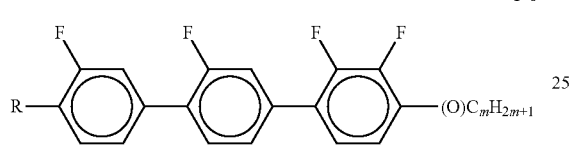

T-7
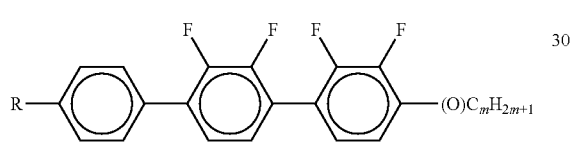

T-8
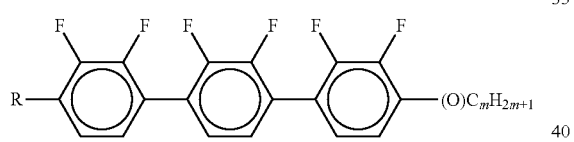

T-9
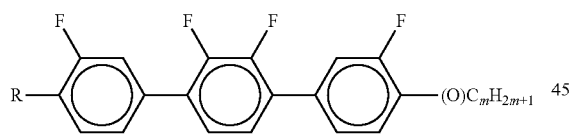

T-10
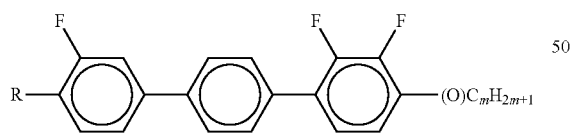

T-11
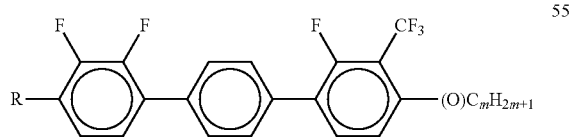

T-12
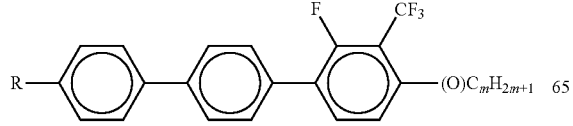

-continued

T-13
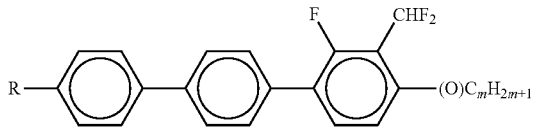

T-14
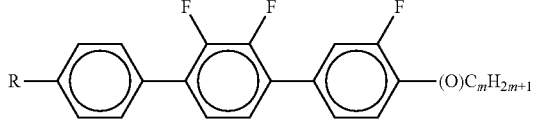

T-15
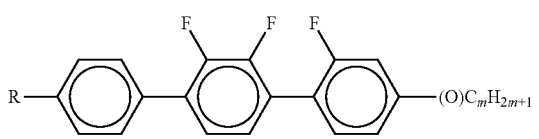

T-16
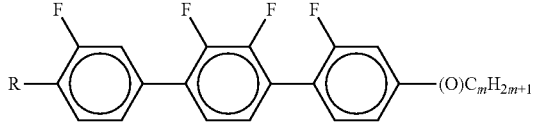

T-17
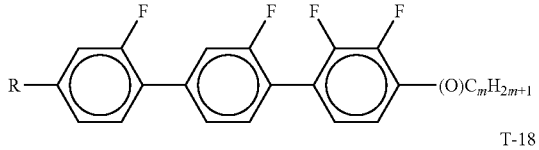

T-18
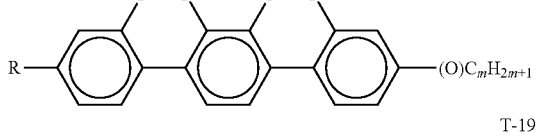

T-19
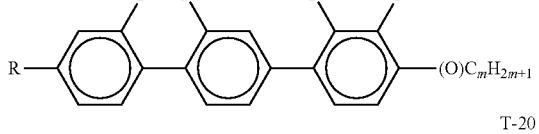

T-20
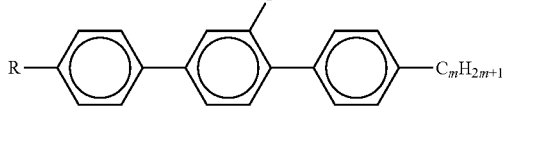

in which

R denotes a straight-chain alkyl or alkoxy radical having 1-7 C atoms, and m is 1-6.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-20 in amounts of 2-30% by weight, in particular 5-20% by weight.

Particular preference is given to compounds of the formulae T-1, T-2 and T-20. In these compounds, R preferably denotes alkyl, furthermore alkoxy, each having 1-5 C atoms.

The terphenyls are preferably employed in the mixtures according to the invention if the Δn value of the mixture is to be ≧0.1. Preferred mixtures comprise 2-20% by weight of one or more terphenyl compounds selected from the group of the compounds T-1 to T-20.

k) Liquid-crystalline medium additionally comprising one or more biphenyls of the formulae B-1 to B-3:

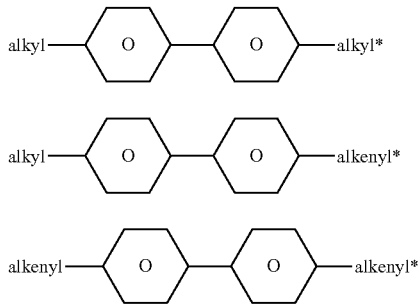

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular 5% by weight.

Of the compounds of the formulae B-1 to B-3, the compounds of the formula B-2 are particularly preferred.

Particularly preferred biphenyls are

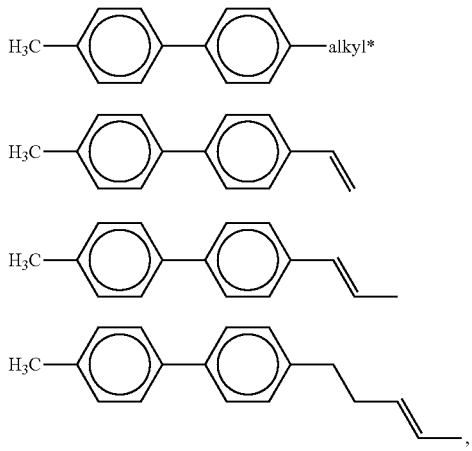

in which alkyl* denotes an alkyl radical having 1-6 C atoms. The medium according to the invention particularly preferably comprises one or more compounds of the formulae B-1a and/or B-2c.

l) Liquid-crystalline medium comprising at least one compound of the formulae Z-1 to Z-7:

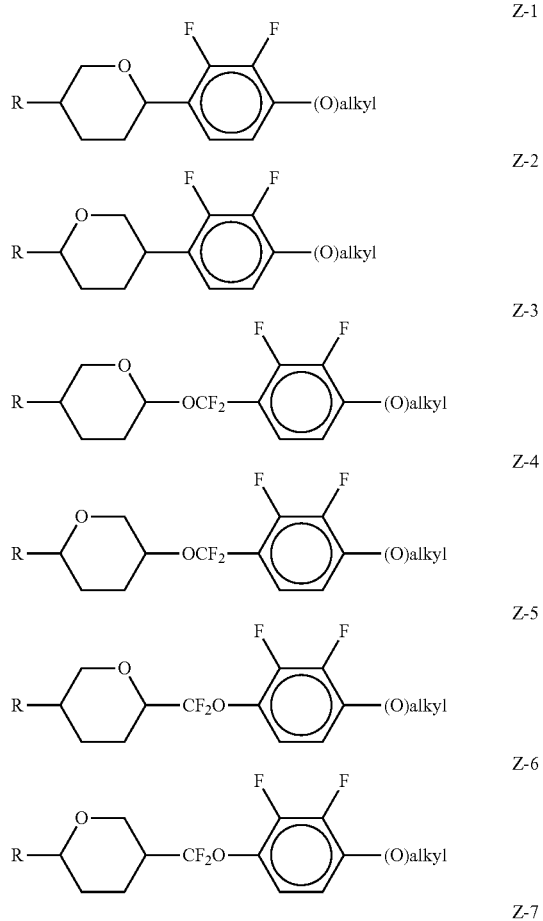

in which R and alkyl have the meanings indicated above, m) Liquid-crystalline medium comprising at least one compound of the formulae O-1 to O-18:

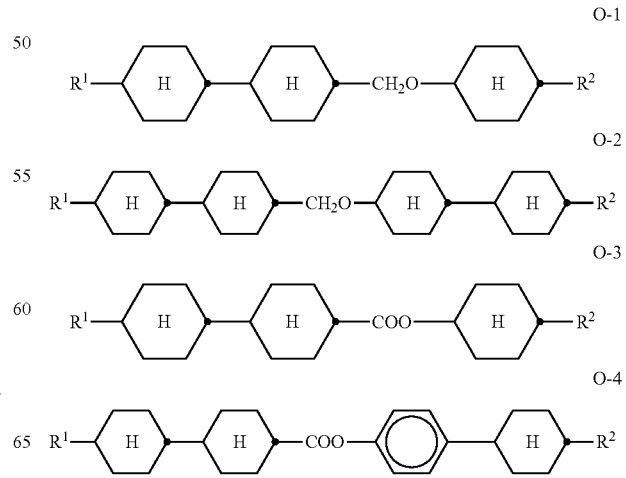

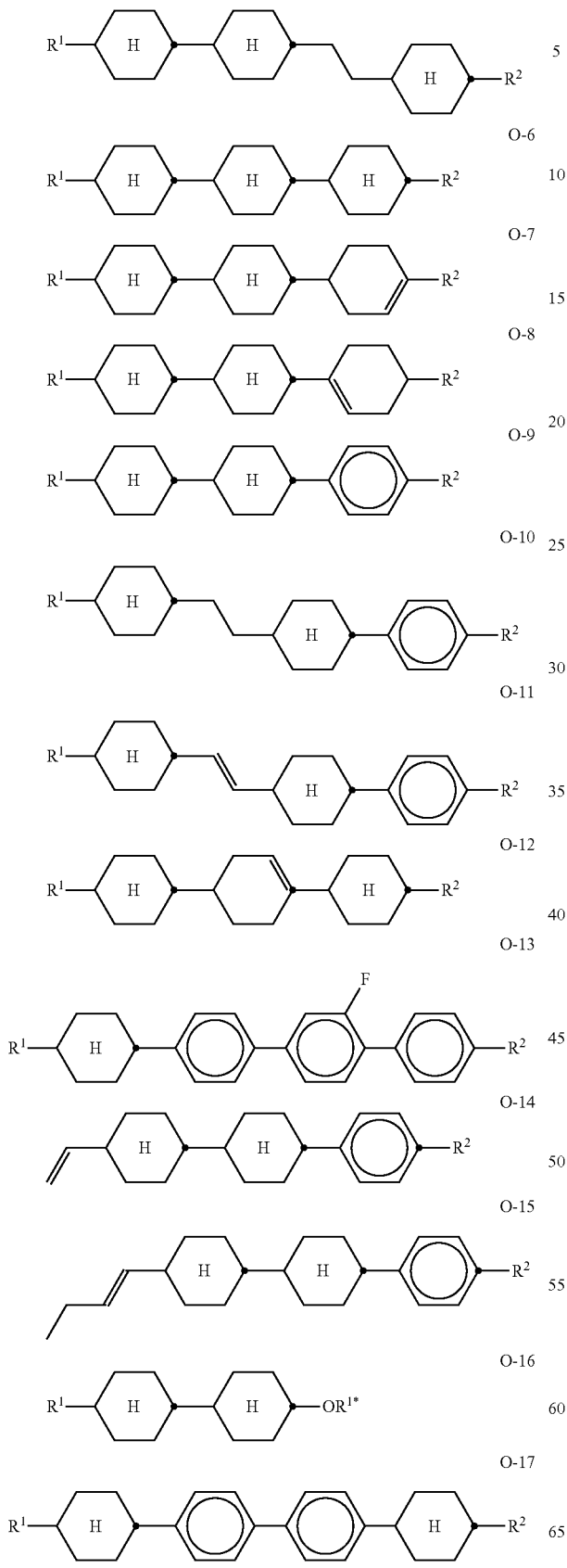

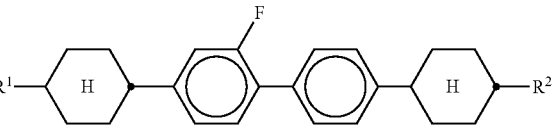

in which $R^1$ and $R^2$ have the meanings indicated for $R^{2A}$, $R^1$ and $R^2$ preferably each, independently of one another, denote straight-chain alkyl.

Preferred media comprise one or more compounds of the formulae O-1, O-3, O-4, O-9, O-13, O-14, O-15, O-16, O-17 and/or O-18.

n) Preferred liquid-crystalline media according to the invention comprise one or more substances which contain a tetrahydronaphthyl or naphthyl unit, such as, for example, the compounds of the formulae N-1 to N-5:

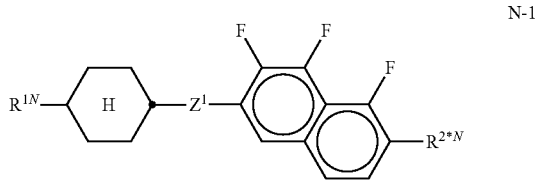

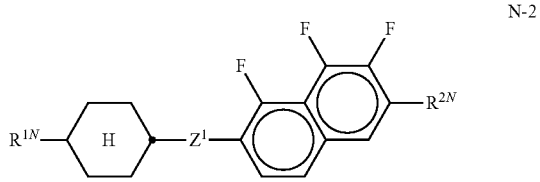

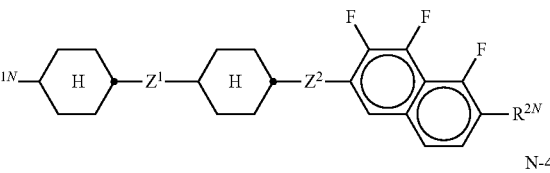

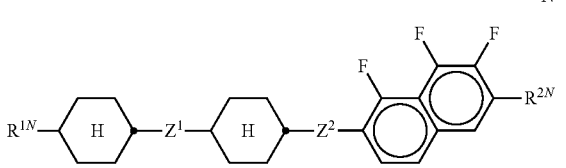

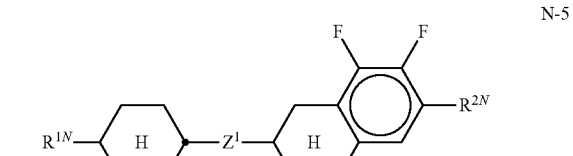

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

o) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF:

BC
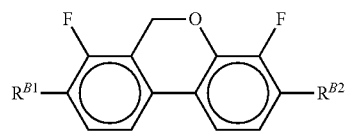

CR
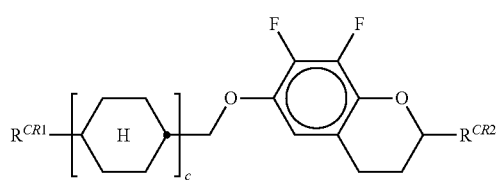

PH-1
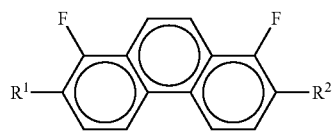

PH-2
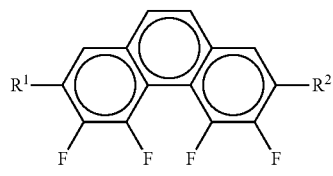

BF
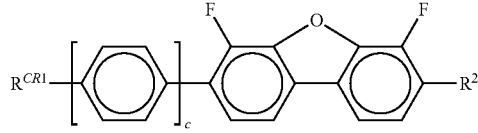

in which $R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably comprise the compounds of the formulae BC, CR, PH-1, PH-2 and/or BF in amounts of 3 to 20% by weight, in particular in amounts of 3 to 15% by weight. Particularly preferred compounds of the formulae BC and CR are the compounds BC-1 to BC-7 and CR-1 to CR-5:

BC-1
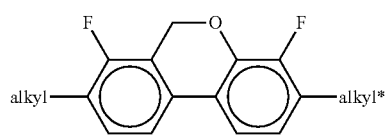

BC-2
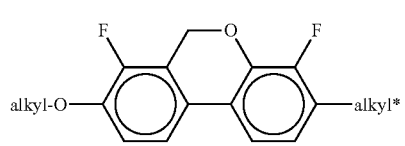

BC-3
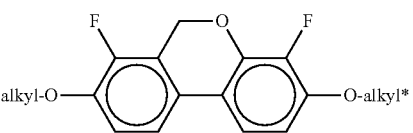

BC-4
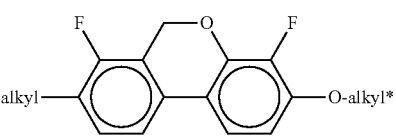

BC-5
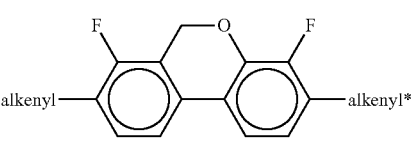

BC-6
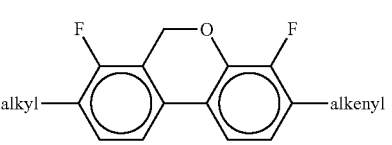

BC-7
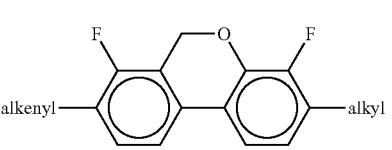

CR-1
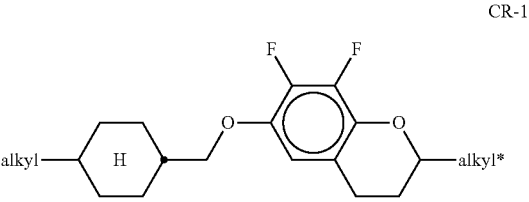

CR-2
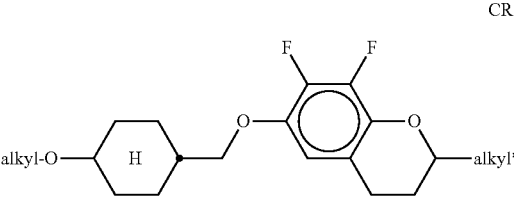

CR-3
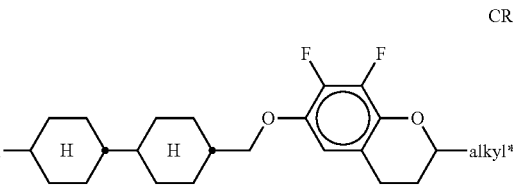

CR-4
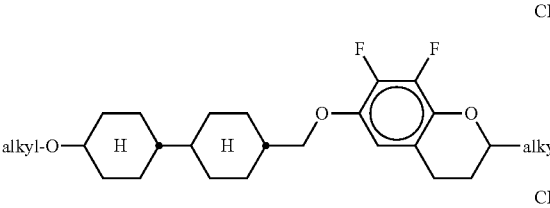

CR-5
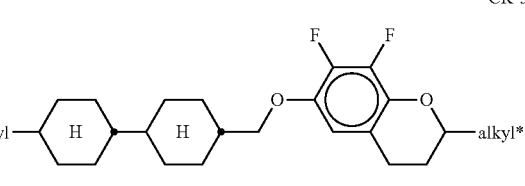

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particular preference is given to mixtures comprising one, two or three compounds of the formula BC-2.

p) Preferred mixtures comprise one or more indane compounds of the formula In $$R^{11}-\left[\boxed{I}\right]_i-\boxed{H}-\text{(indane with } R^{12}, R^{13}, F, F, F\text{)}$$
In in which $R^{11}$, $R^{12}$, $R^{13}$ each, independently of one another, denote a straight-chain alkyl, alkoxy, alkoxyalkyl or alkenyl radical having 1-6 C atoms, $R^{12}$ and $R^{13}$ additionally denote halogen, preferably F, $$-\boxed{I}-$$

denotes (ring structures shown: cyclohexane (H), tetrahydropyran variants, cyclohexene, dioxane, dithiane, oxathiane)

$i$ denotes 0, 1 or 2.

Preferred compounds of the formula In are the compounds of the formulae In-1 to In-16 indicated below:

In-1 through In-10 (structural formulas with $R^{11}$ substituents, varying terminal groups: F, $CH_3$, $C_2H_5$, $C_3H_7$-n)

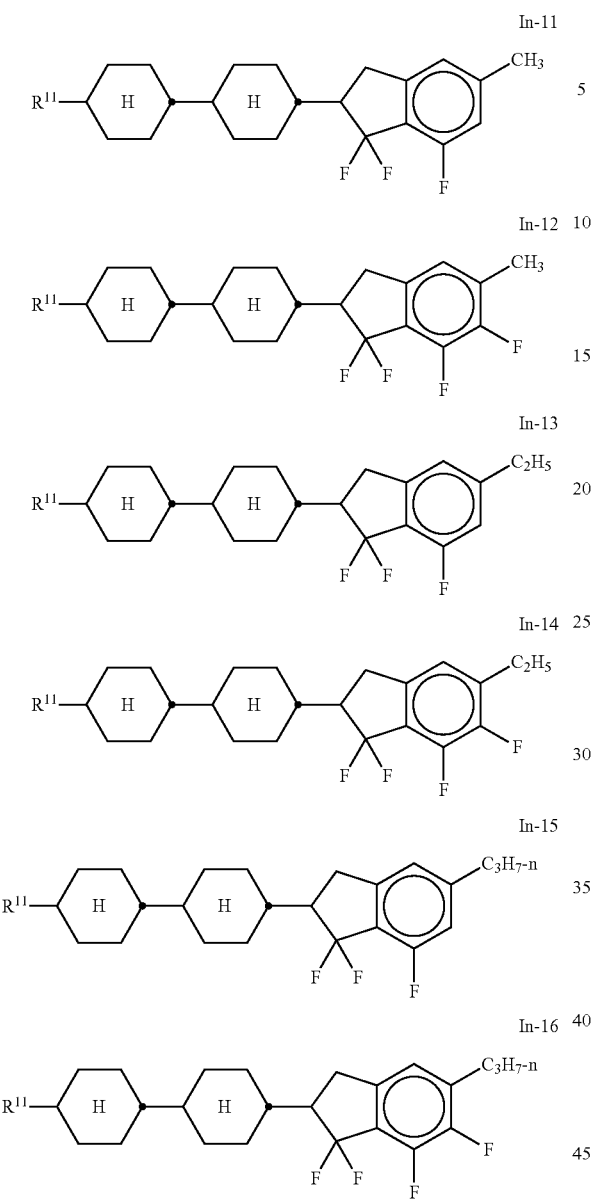

Particular preference is given to the compounds of the formulae In-1, In-2 and In-3.

The compounds of the formula In and the sub-formulae In-1 to In-16 are preferably employed in the mixtures according to the invention in concentrations ≧5% by weight, in particular 5-30% by weight and very particularly preferably 5-25% by weight.

q) Preferred mixtures additionally comprise one or more compounds of the formulae L-1 to L-11:

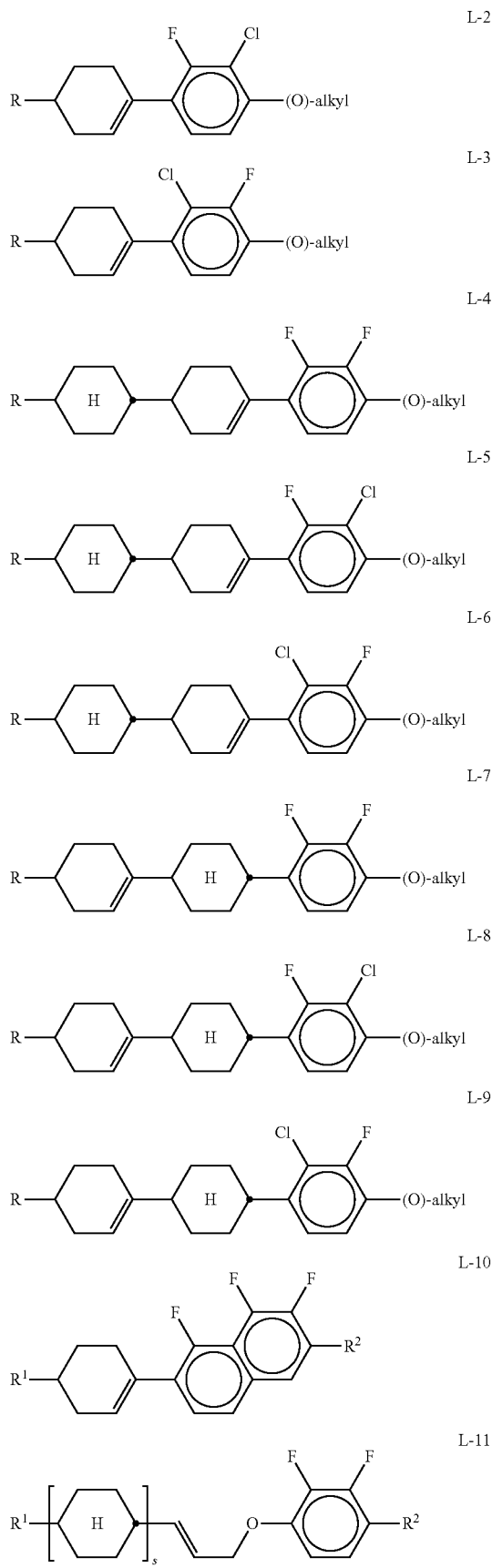

in which

R, $R^1$ and $R^2$ each, independently of one another, have the meanings indicated for $R^{2-4}$ in Claim 2, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Very particularly preferred embodiments are indicated below.

The medium according to the invention comprises at feast three compounds selected from the group of the compounds of the formulae I-1 to I-6:

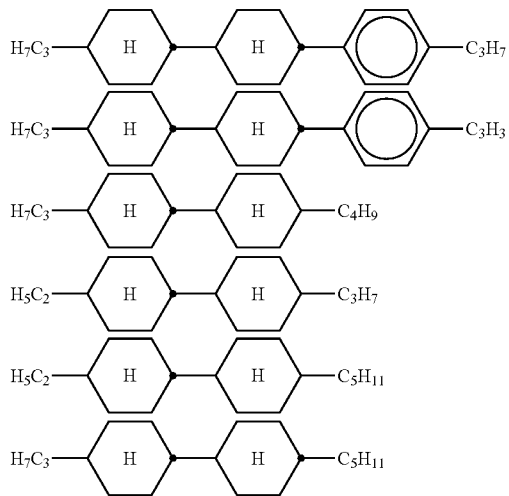

preferably in amounts of 8-50%.

The medium according to the invention comprises the compounds of the formulae I-1 and/or I-2:

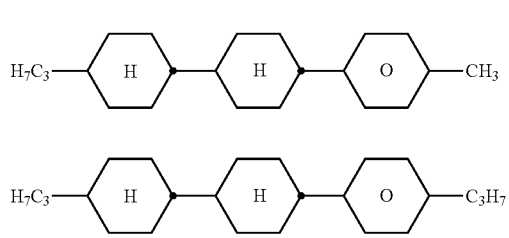

in combination with one or more compounds of the formula

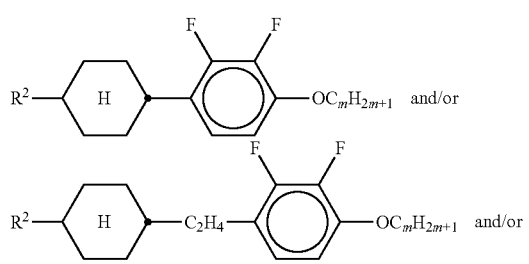

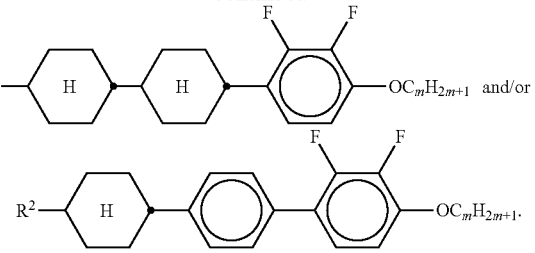

Particularly preferred mixture concepts are indicated below: (the acronyms used are explained in Table A. n and m here each denote, independently of one another, 1-6).

The mixtures according to the invention preferably comprise

CPY-n-Om, in particular CPY-2-O2, CPY-3-O2 and/or CPY-5-O2, preferably in concentrations >5%, in particular 10-30%, based on the mixture as a whole, and/or CY-n-Om, preferably CY-3-O2, CY-3-O4, CY-5-O2 and/or CY-5-O4, preferably in concentrations >5%, in particular 15-50%, based on the mixture as a whole, and/or CCY-n-Om, preferably CCY-4-O2, CCY-3-O2, CCY-3-O3 and/or CCY-5-O2, preferably in concentrations >5%, in particular 10-30%, based on the mixture as a whole, and/or CLY-n-Om, preferably CLY-2-O4, CLY-3-O2 and/or CLY-3-O3, preferably in concentrations >5%, in particular 10-30%, based on the mixture as a whole, and/or CK-n-F, preferably CK-3-F, CK-4-F and/or CK-5-F, preferably in concentrations of >5%, in particular 5-25%, based on the mixture as a whole, where the proportion of all mesogenic compounds in the liquid-crystalline mixture according to the invention is ≦100%.

Preference is furthermore given to mixtures according to the invention which comprise the following mixture concepts:

(n and m each denote, independently of one another, 1-6.)

CPY-n-Om and CY-n-Om, preferably in concentrations of 10-80%, based on the mixture as a whole, and/or CPY-n-Om and CK-n-F, preferably in concentrations of 10-70%, based on the mixture as a whole, and/or CPY-n-Om and CK-n-F and CLY-n-Om, preferably in concentrations of 10-80%, based on the mixture as a whole, where the proportion of all mesogenic compounds in the liquid-crystalline mixture according to the invention is ≦100%.

The invention furthermore relates to an electro-optical display having active-matrix addressing based on the ECB, IPS or FFS effect, characterised in that it contains, as dielectric, a liquid-crystalline medium according to one or more of Claims 1 to 9.

The liquid-crystalline medium according to the invention preferably has a nematic phase from ≦−20° C. to ≧70° C., particularly preferably from ≦−30° C. to ≧80° C., very particularly preferably from ≦−40° C. to ≧90° C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence $\Delta n$ in the liquid-crystal mixture are generally between 0.07 and 0.16, preferably between 0.08 and 0.12.

The liquid-crystal mixture according to the invention has a $\Delta\epsilon$ of −0.5 to −8.0, in particular −3.0 to −6.0, where $\Delta\epsilon$ denotes the dielectric anisotropy. The rotational viscosity $\gamma_1$ at 20° C. is preferably 165 mPa·s, in particular ≦140 mPa·s.

The liquid-crystal media according to the invention have relatively low values for the threshold voltage ($V_0$). They are preferably in the range from 1.7 V to 3.0 V, particularly preferably ≦2.75 V and very particularly preferably ≦2.4 V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio, in particular after exposure to display backlights, in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\epsilon>1.5$, the term "dielectrically neutral compounds" denotes those having $-1.5 \leqq \Delta\epsilon \leqq 1.5$ and the term "dielectrically negative compounds" denotes those having $\Delta\epsilon<-1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVE and ASV. They are furthermore suitable for IPS (in-plane switching) and FFS (fringe field switching) applications having negative $\Delta\epsilon$.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≦−0.5. Besides one or more compounds of the formula I, it preferably comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of $\Delta\epsilon \leqq -0.8$ is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably 18 to 25 components.

Besides one or more compounds of the formula 1, the phases preferably comprise 4 to 15, in particular 5 to 12, and particularly preferably <10, compounds of the formulae IIA, IIB and/or IIC and optionally III.

Besides compounds of the formula I and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV

$$R^{20}\text{-L-G-E-}R^{21} \quad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline,

| G denotes | —CH=CH— | —N(O)=N— |
|---|---|---|
| | —CH=CQ- | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO-Phe-COO— |
| | —CF$_2$O— | —CF=CF— |
| | —OCF$_2$— | —OCH$_2$— |
| | —(CH$_2$)$_4$— | —(CH$_2$)$_3$O— | or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox-1076 from Ciba, is preferably added to the mixture comprising polymerisable compounds in amounts of 0-1%. Mixtures of this type can be used for so-called polymer-stabilised VA modes (PS-VA), in which polymerisation of the reactive mesogens is intended to take place in the liquid-crystalline mixture. The prerequisite for this is that the liquid-crystal mixture does not itself comprise any polymerisable components. Suitable polymerisable compounds are listed, for example, in Table D.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote per cent by weight; all temperatures are indicated in degrees Celsius.

Besides the compounds of the formulae IIA and/or IIB and/or IIC, one or more compounds of the formula I, the mixtures according to the invention preferably comprise one or more of the compounds from Table A indicated below.

TABLE A

BCH-nm

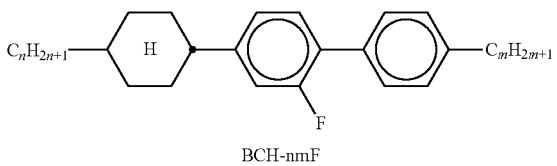

BCH-nmF

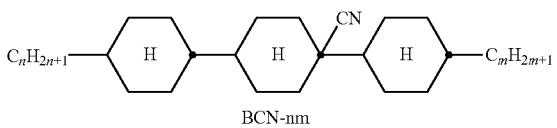

BCN-nm

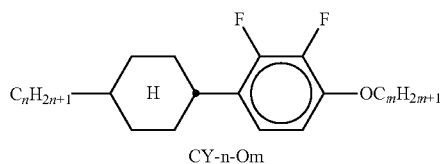

CY-n-Om

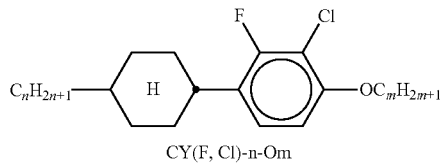

CY(F, Cl)-n-Om

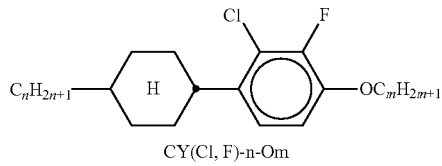

CY(Cl, F)-n-Om

TABLE A-continued
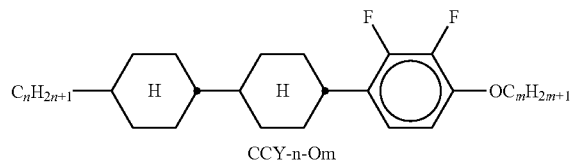
CCY-n-Om
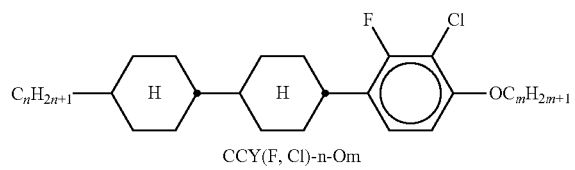
CCY(F, Cl)-n-Om
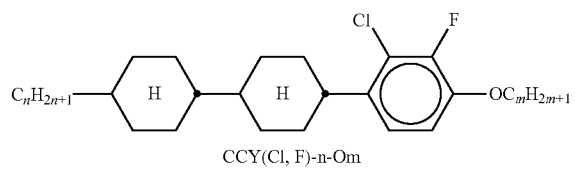
CCY(Cl, F)-n-Om
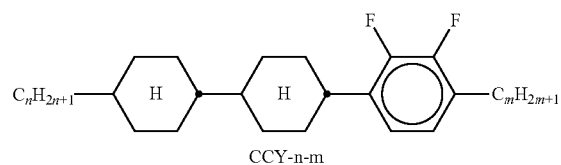
CCY-n-m
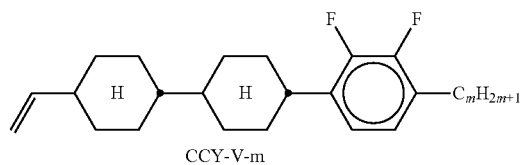
CCY-V-m
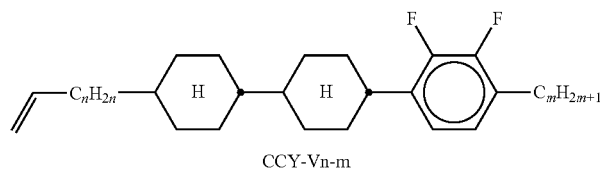
CCY-Vn-m
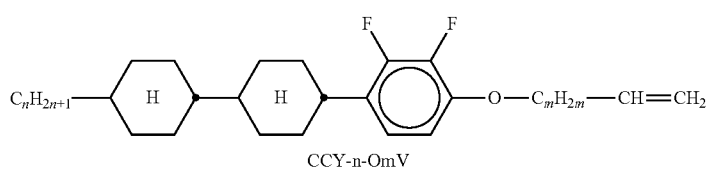
CCY-n-OmV
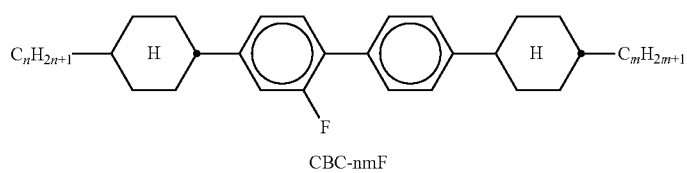
CBC-nmF
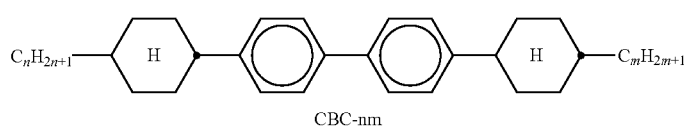
CBC-nm TABLE A-continued
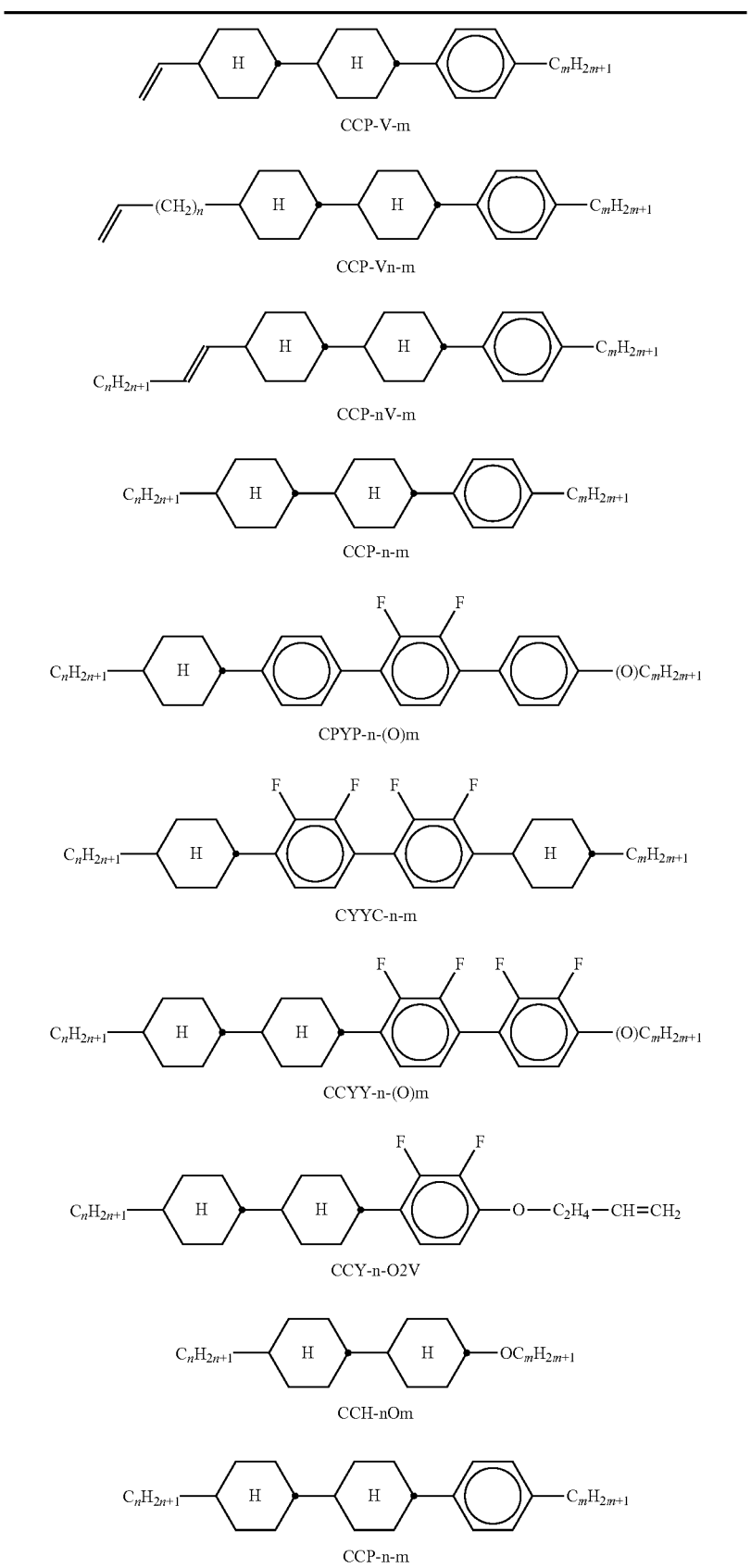

TABLE A-continued
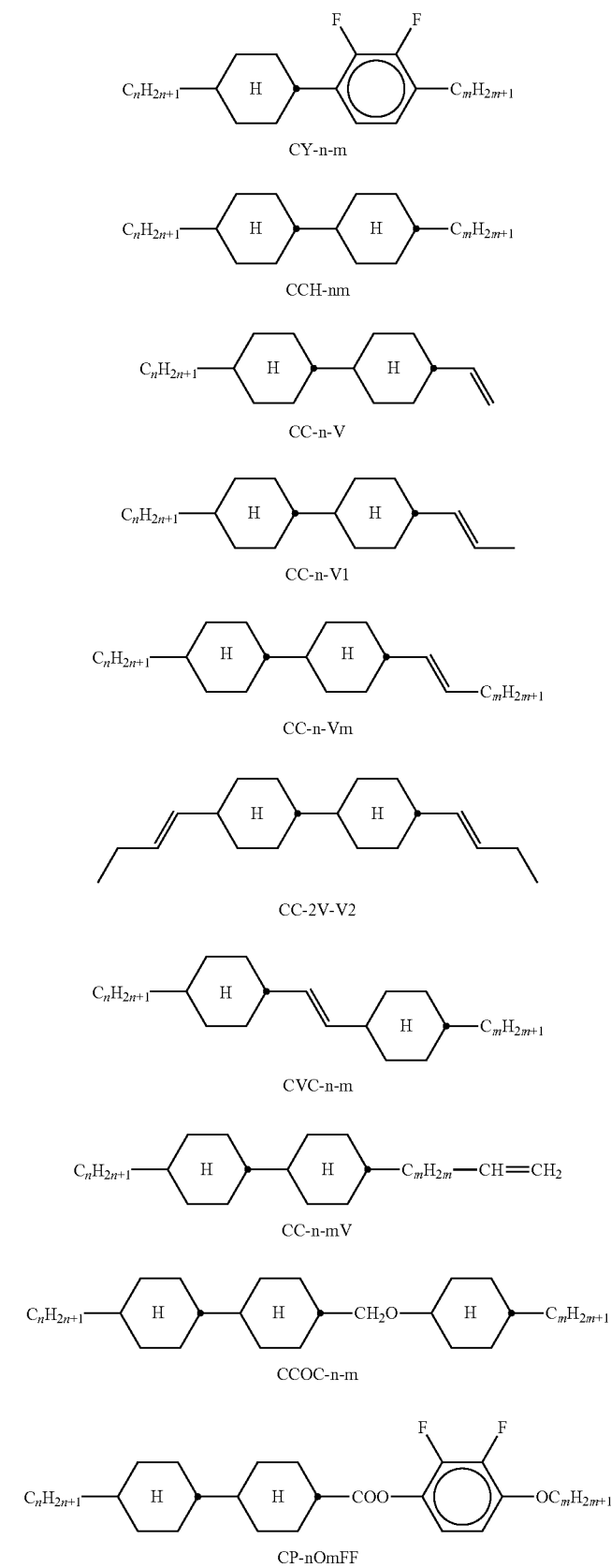

TABLE A-continued
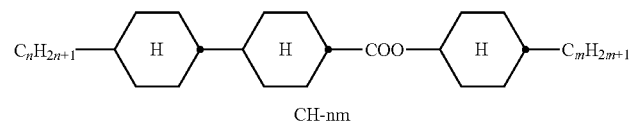
CH-nm
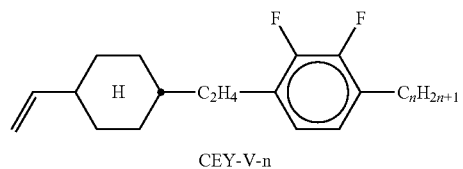
CEY-V-n
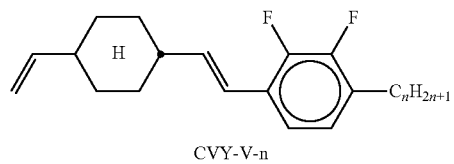
CVY-V-n
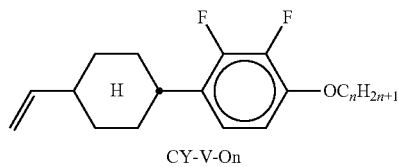
CY-V-On
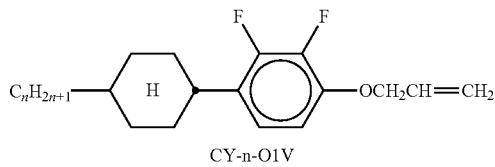
CY-n-O1V
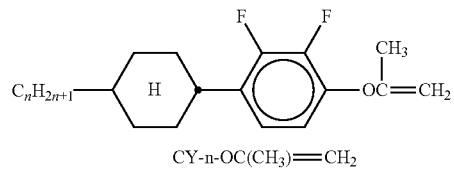
CY-n-OC(CH$_3$)=CH$_2$
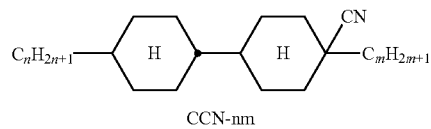
CCN-nm
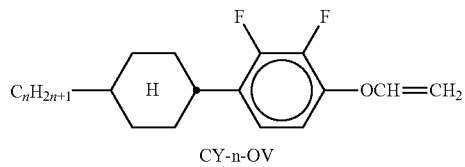
CY-n-OV
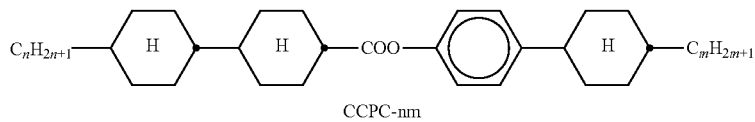
CCPC-nm TABLE A-continued
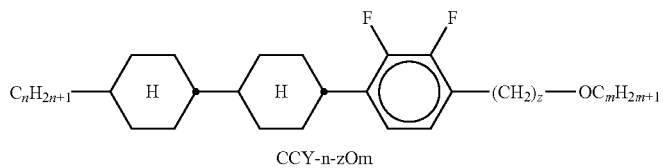
CCY-n-zOm
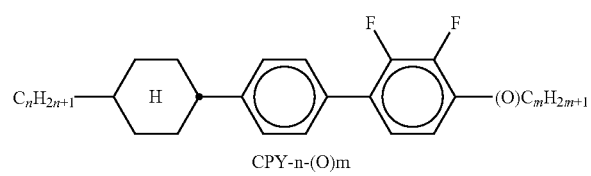
CPY-n-(O)m
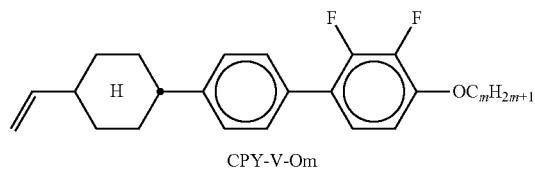
CPY-V-Om
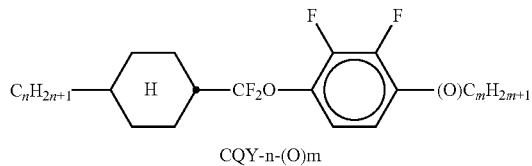
CQY-n-(O)m
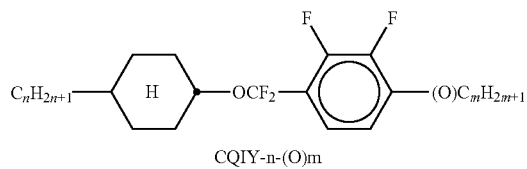
CQIY-n-(O)m
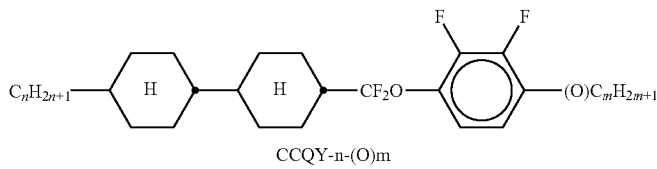
CCQY-n-(O)m
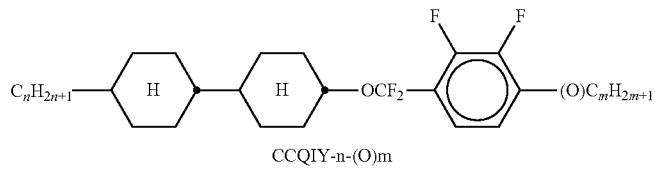
CCQIY-n-(O)m
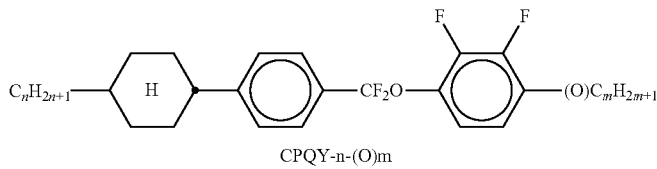
CPQY-n-(O)m
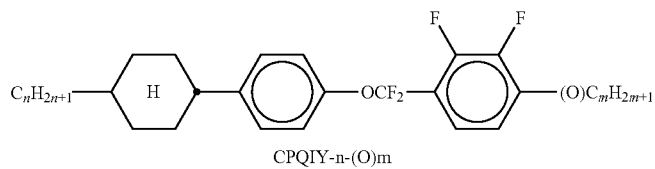
CPQIY-n-(O)m TABLE A-continued
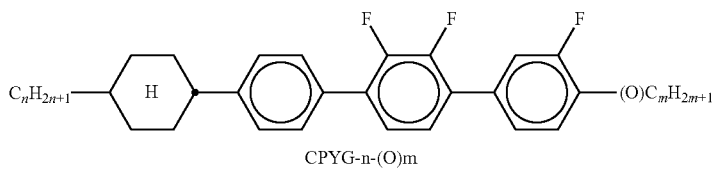
CPYG-n-(O)m
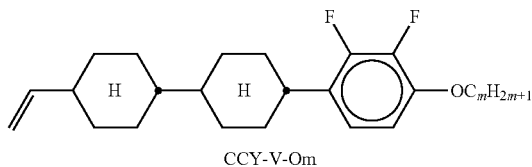
CCY-V-Om
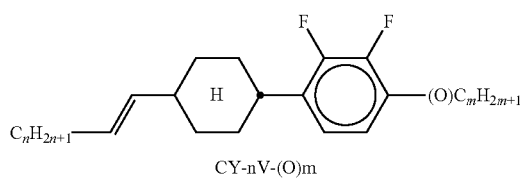
CY-nV-(O)m
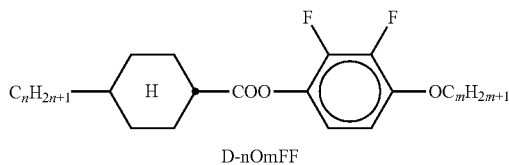
D-nOmFF
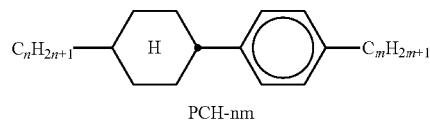
PCH-nm
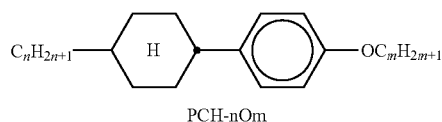
PCH-nOm
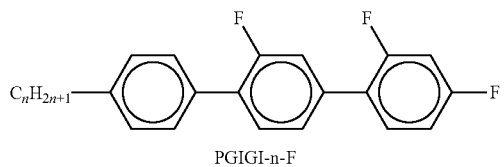
PGIGI-n-F
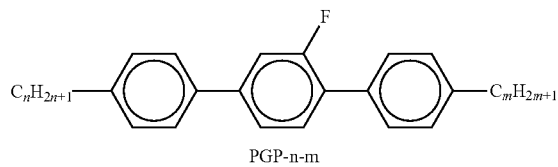
PGP-n-m
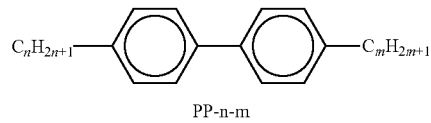
PP-n-m TABLE A-continued
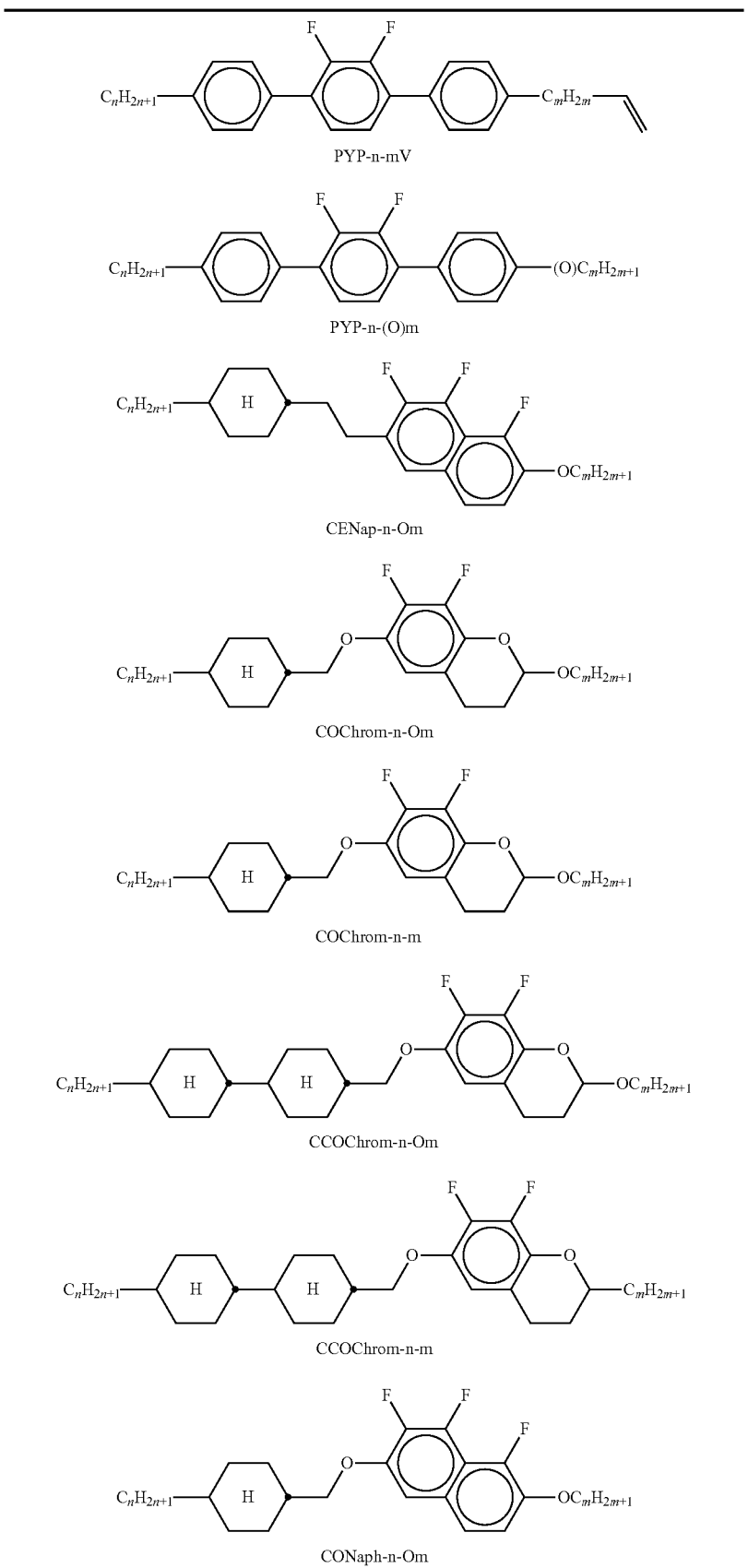

TABLE A-continued
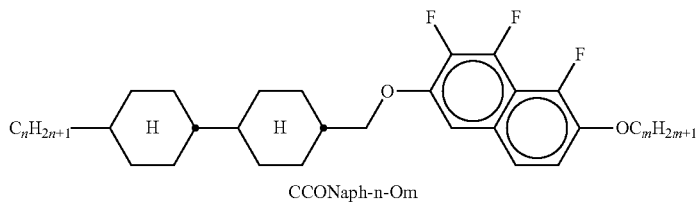
CCONaph-n-Om
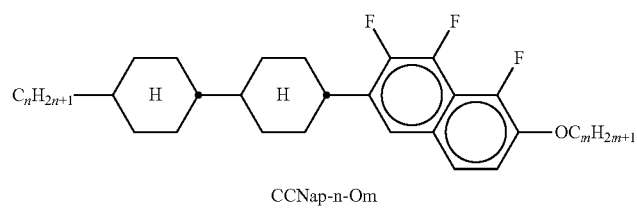
CCNap-n-Om
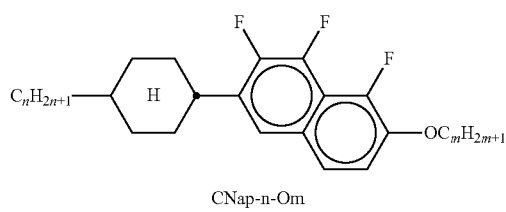
CNap-n-Om
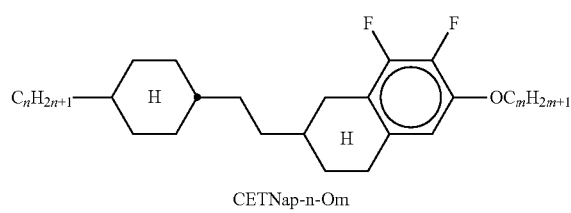
CETNap-n-Om
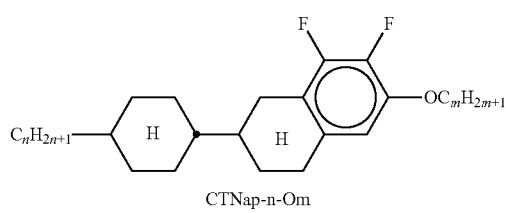
CTNap-n-Om
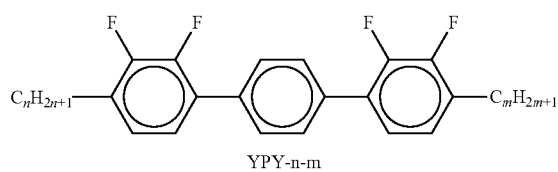
YPY-n-m
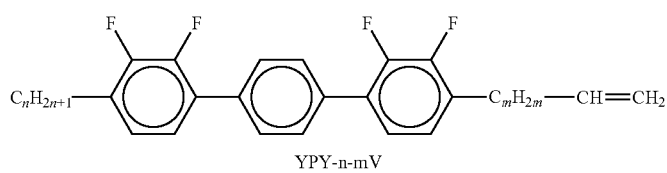
YPY-n-mV
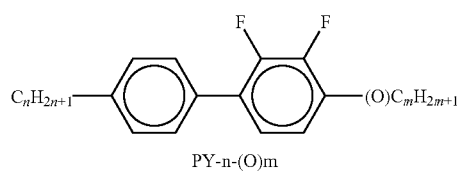
PY-n-(O)m TABLE A-continued
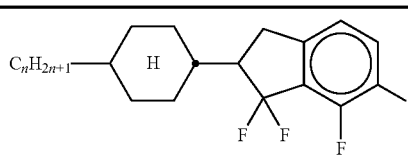
CK-n-F
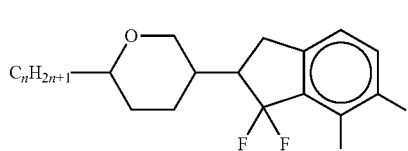
AlK-n-F
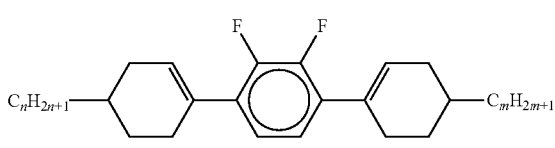
LYLI-n-m
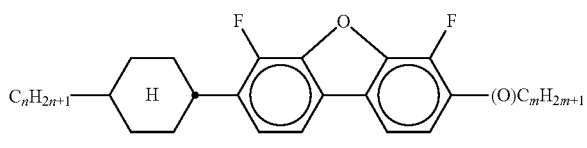
C-DFDBF-n-(O)m
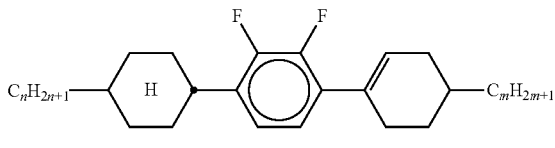
CYLI-n-m
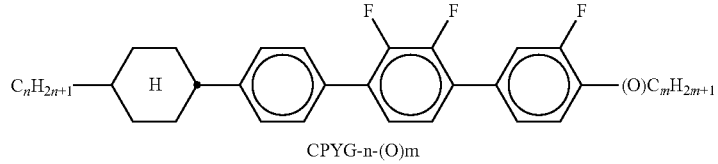
CPYG-n-(O)m
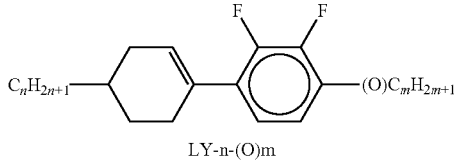
LY-n-(O)m
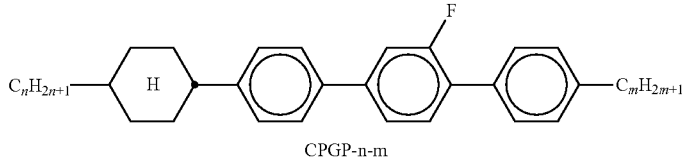
CPGP-n-m
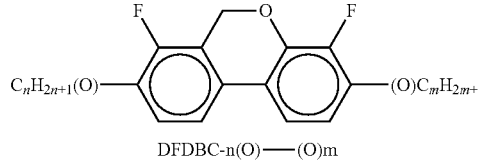
DFDBC-n(O)—(O)m TABLE A-continued
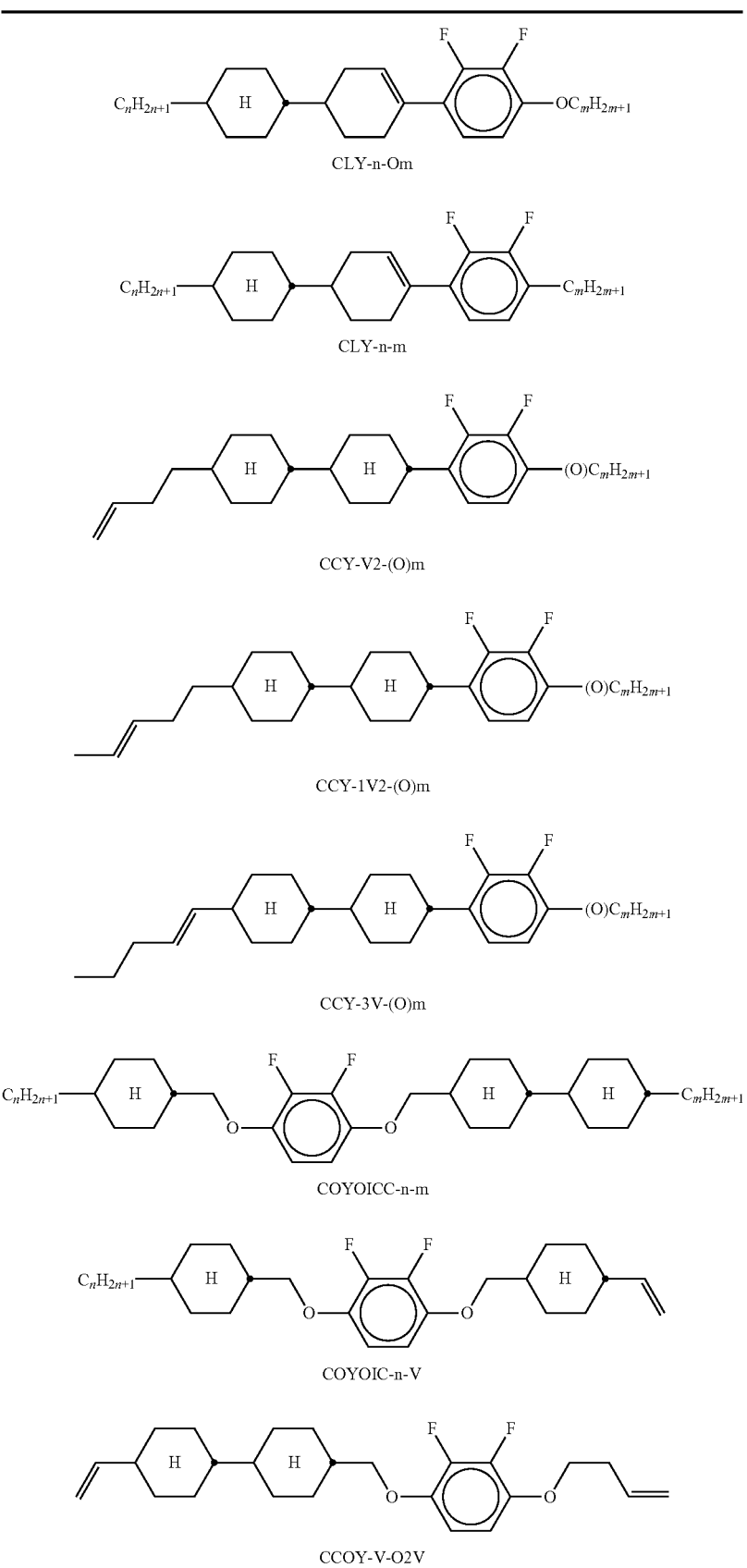

TABLE A-continued

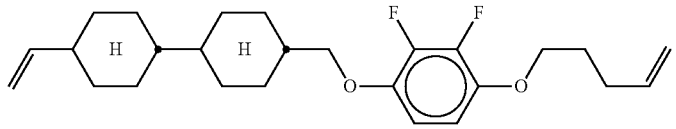

CCOY-V-O3V

The following abbreviations are used:
(n, m, z: each, independently of one another, 1, 2, 3, 4, 5 or 6;
(O)$C_mH_{2m+1}$ means $OC_mH_{2m+1}$ or $C_mH_{2m+1}$)

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Table B shows possible dopants which can be added to the mixtures according to the invention. If the mixtures comprise a dopant, it is employed in amounts of 0.01-4% by weight, preferably 0.1-1.0% by weight.

TABLE B

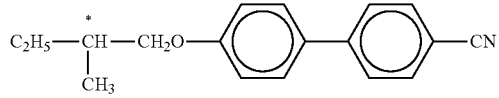

C 15

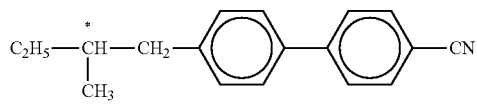

CB 15

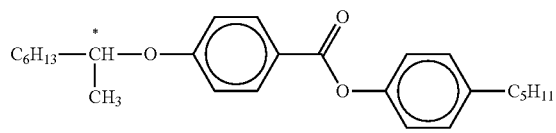

CM 21

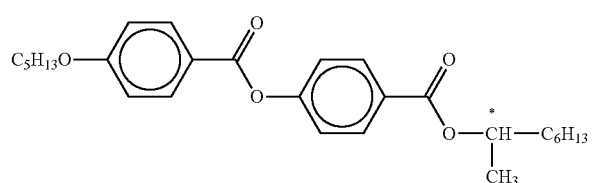

R/S-811

TABLE B-continued
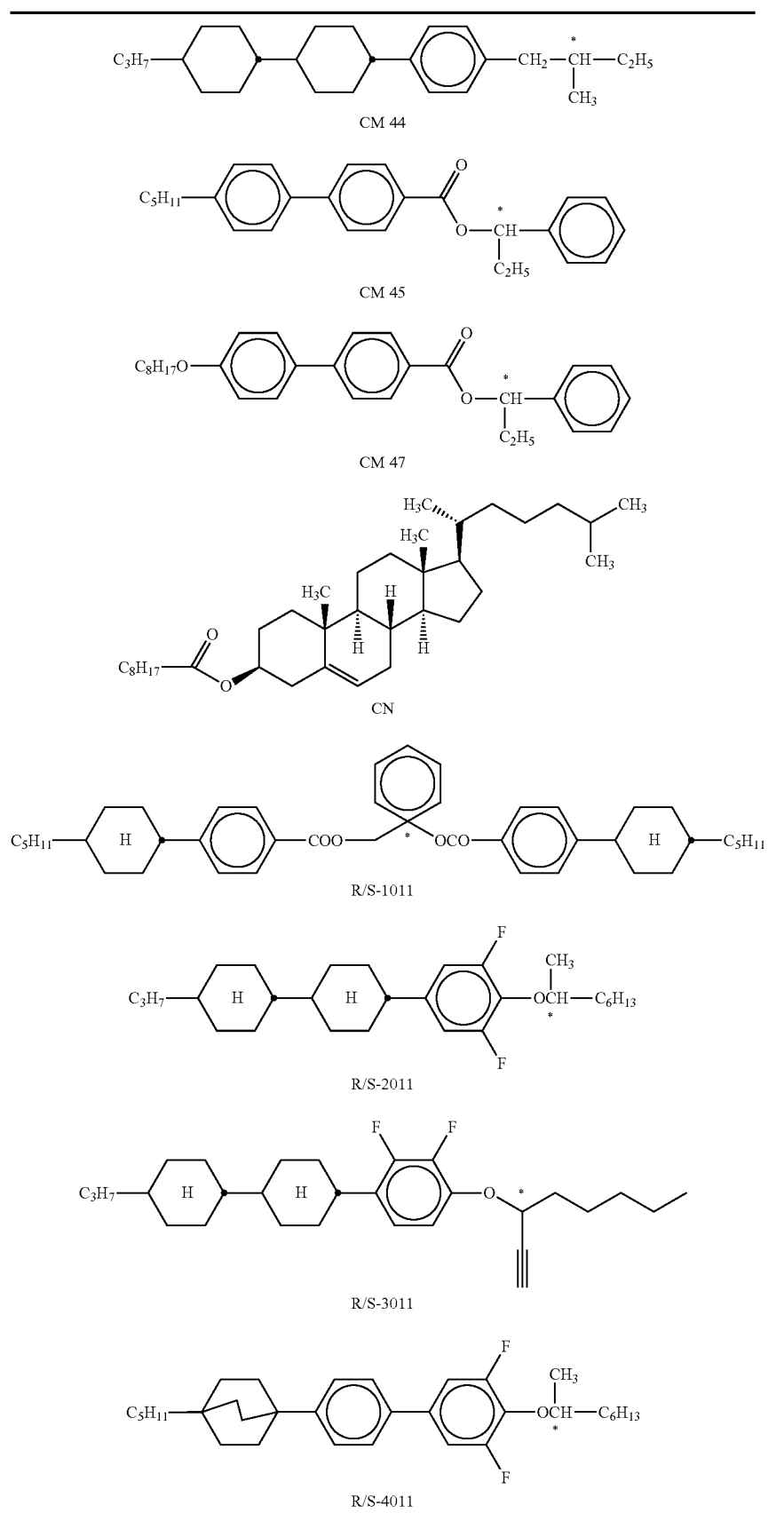

TABLE B-continued

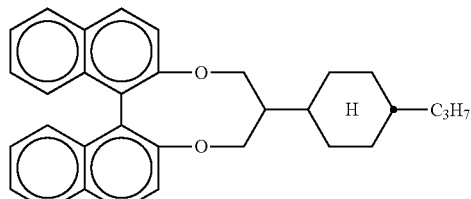

R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl4-alkylphenols, and Tinuvin 770.

TABLE C (n = 1-12)

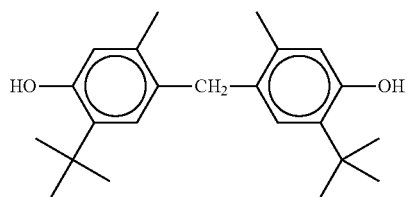

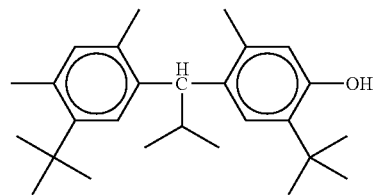

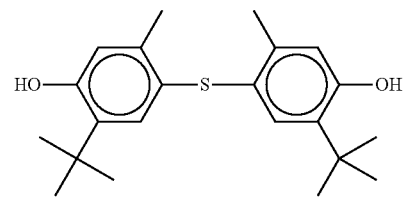

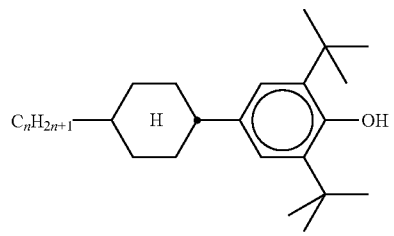

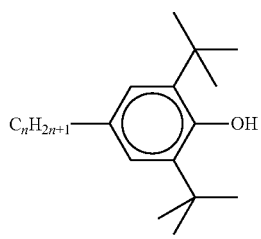

n = 1, 2, 3, 4, 5, 6 or 7

TABLE C-continued
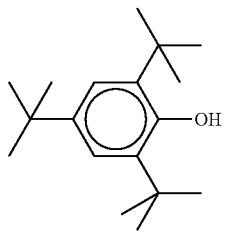
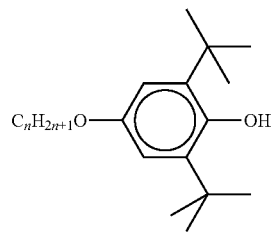
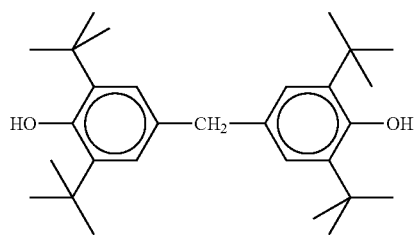
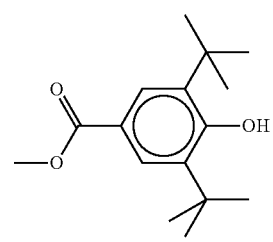
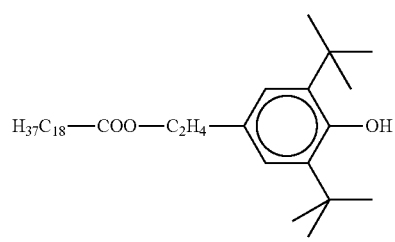
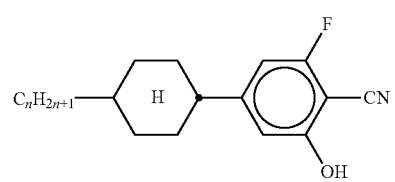
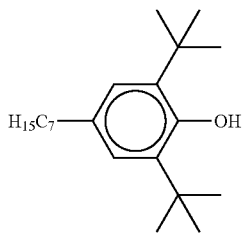

TABLE C-continued
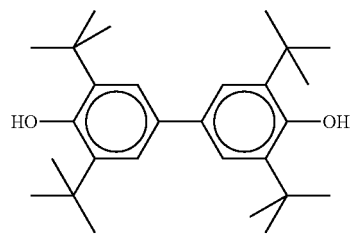
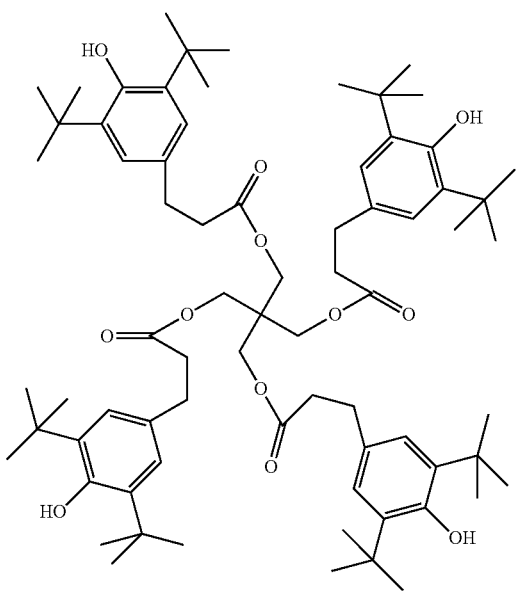 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
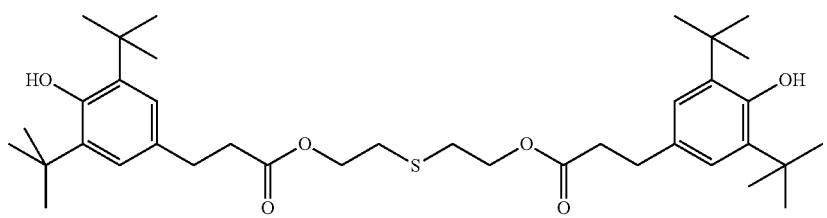 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
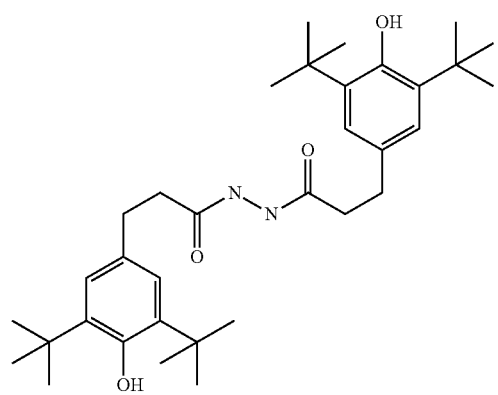 [SMILES: CC(C)(C)c1cc(CCC(=O)NNC(=O)CCc2cc(C(C)(C)C)c(O)c(C(C)(C)C)c2)cc(C(C)(C)C)c1O]

TABLE C-continued
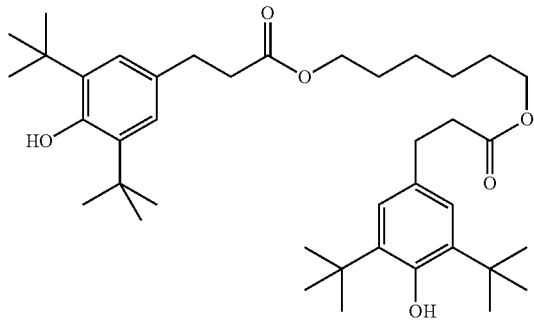 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
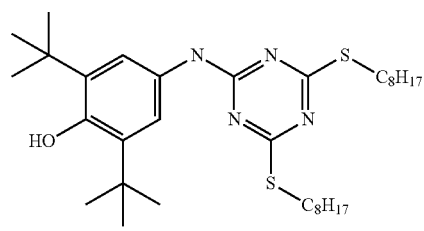
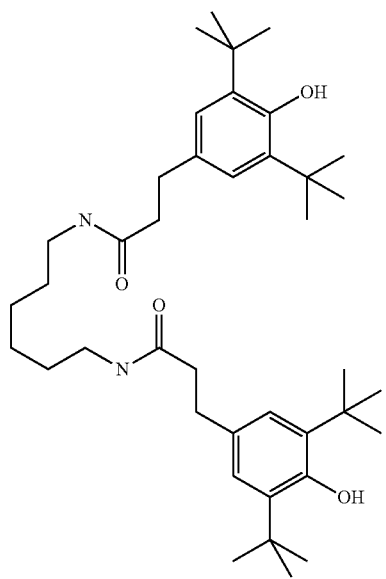 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
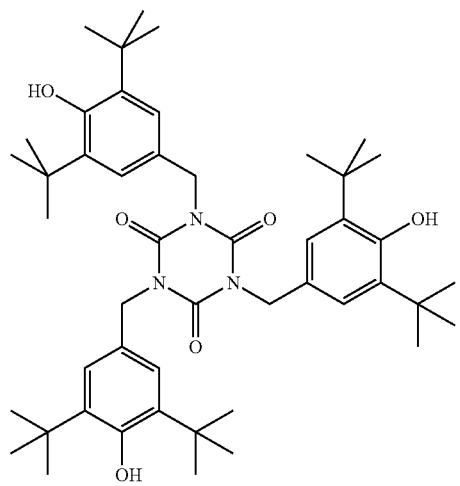 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
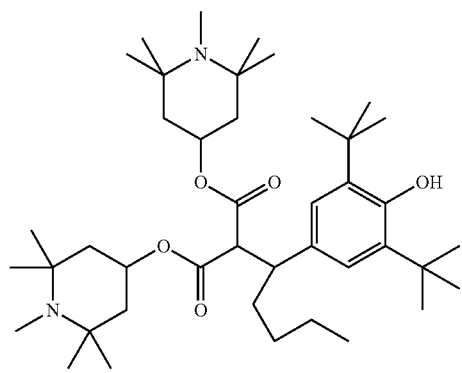 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
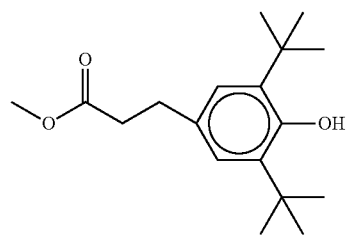
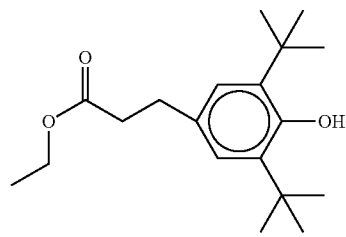
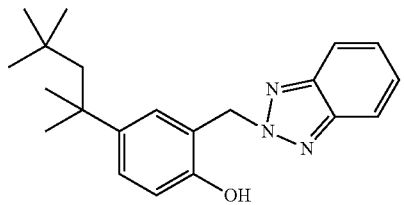 [SMILES: CC(C)(C)CC(C)(C)c1ccc(O)c(Cn2nc3ccccc3n2)c1]
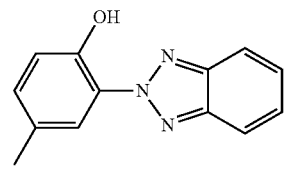 [SMILES: Cc1ccc(O)c(-n2nc3ccccc3n2)c1]
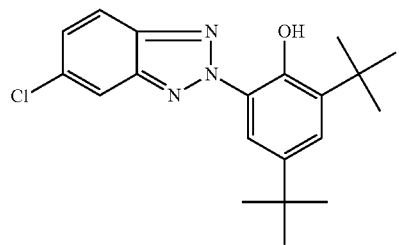 [SMILES: CC(C)(C)c1cc(-n2nc3ccc(Cl)cc3n2)c(O)c(C(C)(C)C)c1]

TABLE C-continued
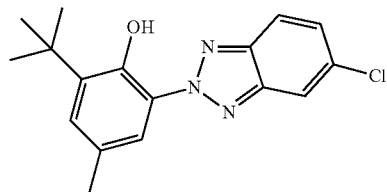 [SMILES: Cc1cc(-n2nc3ccc(Cl)cc3n2)c(O)c(C(C)(C)C)c1]
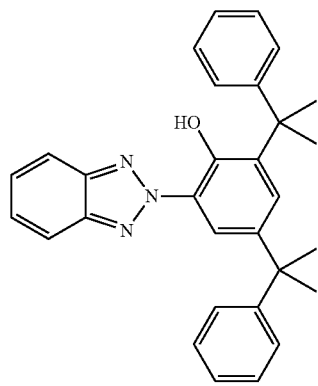 [SMILES: CC(C)(c1ccccc1)c1cc(-n2nc3ccccc3n2)c(O)c(C(C)(C)c2ccccc2)c1]
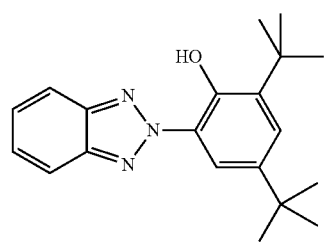 [SMILES: CC(C)(C)c1cc(-n2nc3ccccc3n2)c(O)c(C(C)(C)C)c1]
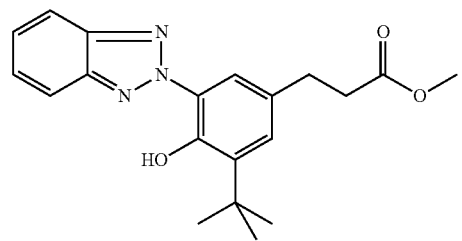 [SMILES: COC(=O)CCc1cc(-n2nc3ccccc3n2)c(O)c(C(C)(C)C)c1]
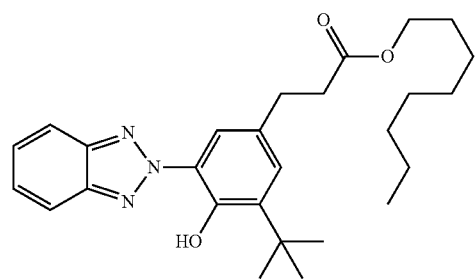 [SMILES: CCCCCCCCOC(=O)CCc1cc(-n2nc3ccccc3n2)c(O)c(C(C)(C)C)c1]

TABLE C-continued
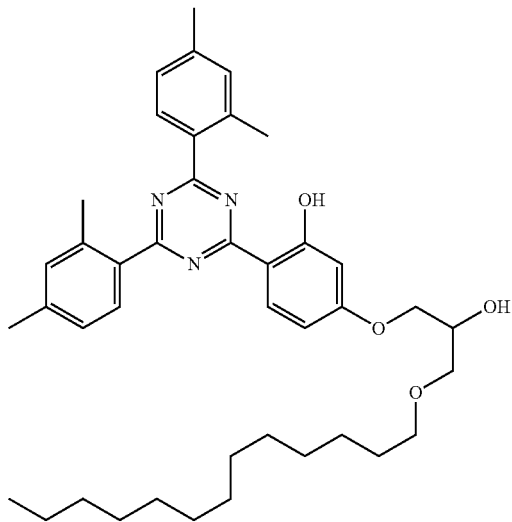 [SMILES: CCCCCCCCCCCCCOCC(O)COc1ccc(-c2nc(-c3ccc(C)cc3C)nc(-c3ccc(C)cc3C)n2)c(O)c1]
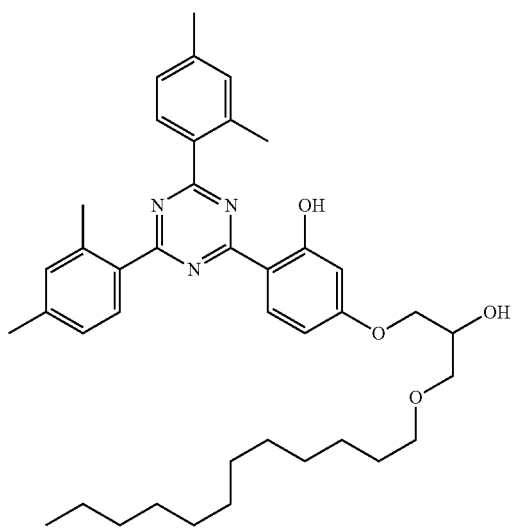 [SMILES: CCCCCCCCCCCCOCC(O)COc1ccc(-c2nc(-c3ccc(C)cc3C)nc(-c3ccc(C)cc3C)n2)c(O)c1]
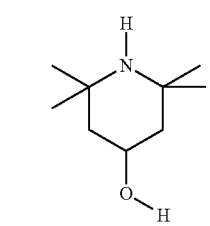
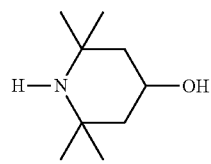
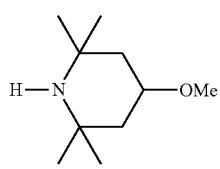

TABLE C-continued
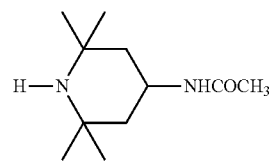
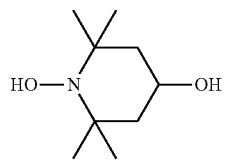
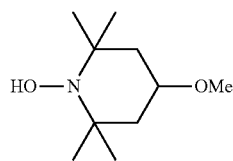
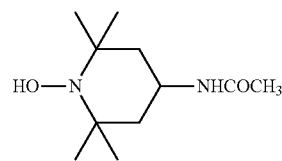
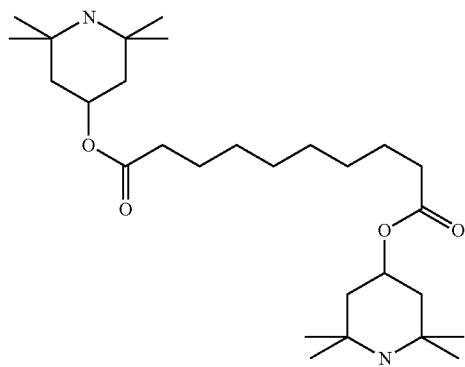
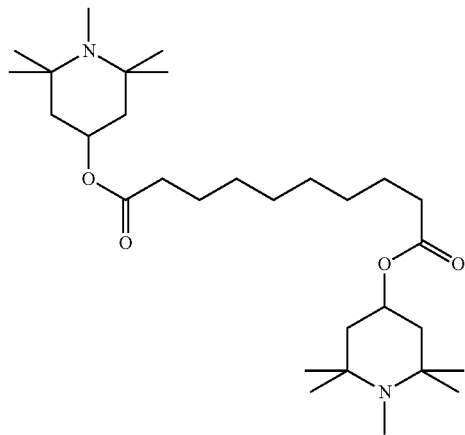

Suitable reactive mesogens for use of the mixtures according to the invention in PS-VA applications are shown in Table D below:

SE-1211 (Nissan Chemicals) on the insides of the outer plates, which effect a homeotropic alignment of the liquid crystals.

TABLE D

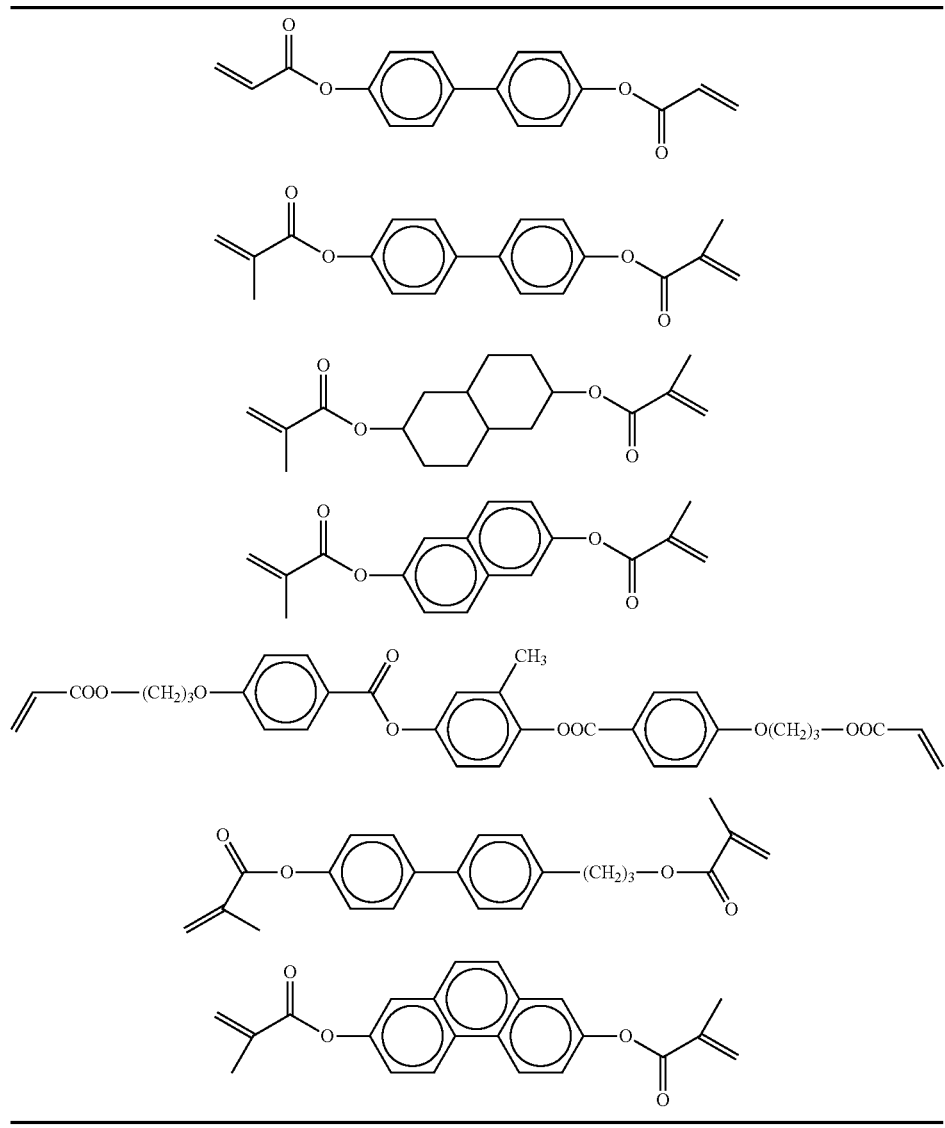

The following examples are intended to explain the invention without limiting it. Above and below,

| | |
|---|---|
| $V_0$ | denotes the threshold voltage, capacitive [V] at 20° C. |
| $\Delta n$ | denotes the optical anisotropy measured at 20° C. and 589 nm |
| $\Delta\epsilon$ | denotes the dielectric anisotropy at 20° C. and 1 kHz |
| cl.p. | denotes the clearing point [° C.] |
| $K_1$ | denotes the elastic constant, "splay" deformation at 20° C. [pN] |
| $K_3$ | denotes the elastic constant, "bend" deformation at 20° C. [pN] |
| $\gamma_1$ | denotes the rotational viscosity measured at 20° C. [mPa·s], determined by the rotation method in a magnetic field |
| LTS | denotes the low-temperature stability (nematic phase), determined in test cells |

The display used for measurement of the threshold voltage has two plane-parallel outer plates at a separation of 20 μm and electrode layers with overlying alignment layers of All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

MIXTURE EXAMPLES

Example 1

| | | | |
|---|---|---|---|
| CY-3-O2 | 24.00% | Clearing point [° C.]: | 79 |
| CY-5-O2 | 7.00% | $\Delta n$ [589 nm, 20° C.]: | 0.0945 |
| CCY-3-O2 | 5.00% | $\Delta\epsilon$ [1 kHz, 20° C.]: | −3.0 |

-continued

| | | | |
|---|---|---|---|
| CPY-2-O2 | 7.00% | $\epsilon_\parallel$ [1 kHz, 20° C.]: | 3.4 |
| CPY-3-O2 | 9.00% | $\epsilon_\perp$ [1 kHz, 20° C.]: | 6.4 |
| CCP-3-3 | 10.00% | $\gamma_1$ [mPa · s, 20° C.]: | 114 |
| CCP-3-1 | 8.00% | $V_0$ [20° C.; V]: | 2.37 |
| BCH-32 | 5.00% | | |
| CCH-34 | 9.00% | | |
| CCH-23 | 16.00% | | |

Example 3

| | | | |
|---|---|---|---|
| CY-3-O2 | 22.00% | Clearing point [°C.]: | 80 |
| CY-5-O2 | 2.00% | $\Delta n$ [589 nm, 20° C.]: | 0.0944 |
| CCY-3-O2 | 8.00% | $\Delta\epsilon$ [1 kHz, 20° C.]: | −3.1 |
| CCY-4-O2 | 4.00% | $\epsilon_\parallel$ [1 kHz, 20° C.]: | 3.4 |
| CPY-2-O2 | 7.00% | $\epsilon_\perp$ [1 kHz, 20° C.]: | 6.5 |
| CPY-3-O2 | 10.00% | $\gamma_1$ [mPa · s, 20° C.]: | 111 |
| CCH-34 | 6.00% | $V_0$ [20° C.; V]: | 2.35 |
| CCH-23 | 22.00% | | |
| CCP-3-3 | 6.00% | | |
| CCP-3-1 | 4.00% | | |
| BCH-32 | 6.00% | | |
| PCH-301 | 3.00% | | |

Example 4

| | | | |
|---|---|---|---|
| CY-3-O2 | 24.00% | Clearing point [°C.]: | 79.5 |
| CY-5-O2 | 7.00% | $\Delta n$ [589 nm, 20° C.]: | 0.0945 |
| CCY-3-O3 | 4.00% | $\Delta\epsilon$ [1 kHz, 20° C.]: | −3.1 |
| CCY-3-02 | 5.00% | $\epsilon_\parallel$ [1 kHz, 20° C.]: | 3.5 |
| CPY-2-O2 | 7.00% | $\epsilon_\perp$ [1 kHz, 20° C.]: | 6.5 |
| CPY-3-O2 | 5.00% | $\gamma_1$ [mPa · s, 20° C.]: | 122 |
| CCP-3-3 | 9.00% | $V_0$ [20° C.; V]: | 2.34 |
| CCP-3-1 | 9.00% | | |
| BCH-32 | 5.00% | | |
| CCH-34 | 10.00% | | |
| CCH-25 | 10.00% | | |
| PCH-301 | 5.00% | | |

Example 5

| | | | |
|---|---|---|---|
| CY-3-O2 | 20.00% | Clearing point [°C.]: | 79 |
| CY-3-O4 | 12.00% | $\Delta n$ [589 nm, 20° C.]: | 0.0947 |
| CCY-3-O3 | 6.00% | $\Delta\epsilon$ [1 kHz, 20° C.]: | −2.9 |
| CPY-2-O2 | 6.00% | $\epsilon_\parallel$ [1 kHz, 20° C.]: | 3.4 |
| CPY-3-O2 | 7.00% | $\epsilon_\perp$ [1 kHz, 20° C.]: | 6.4 |
| CCP-3-3 | 9.00% | $V_0$ [V, 20° C.]: | 2.37 |
| CCP-3-1 | 12.00% | $\gamma_1$ [mPa · s, 20° C.]: | 125 |
| BCH-32 | 5.00% | LTS bulk −30° C.: | >1000 h |
| CCH-34 | 10.00% | | |
| CCH-25 | 9.00% | | |
| PCH-301 | 4.00% | | |

Example 6

| | | | |
|---|---|---|---|
| CY-3-O2 | 20.00% | Clearing point [°C.]: | 79.7 |
| CY-3-O4 | 12.00% | $\Delta n$ [589 nm, 20° C.]: | 0.0948 |

-continued

| | | | |
|---|---|---|---|
| CCY-3-O3 | 5.50% | $\Delta\epsilon$ [1 kHz, 20° C.]: | −3.1 |
| CPY-2-O2 | 8.00% | $\epsilon_\parallel$ [1 kHz, 20° C.]: | 3.5 |
| CPY-3-O2 | 8.00% | $\epsilon_\perp$ [1 kHz, 20° C.]: | 6.6 |
| CCP-3-3 | 10.50% | $V_0$ [V, 20° C.]: | 2.32 |
| CCP-3-1 | 13.00% | LTS bulk −30° C.: | >1000 h |
| BCH-32 | 1.00% | | |
| CCH-34 | 9.00% | | |
| CCH-25 | 9.00% | | |
| PCH-301 | 4.00% | | |

Example 6

| | | | |
|---|---|---|---|
| CY-3-O2 | 20.00% | Clearing point [°C.]: | 79.5 |
| CCY-3-02 | 10.00% | $\Delta n$ [589 nm, 20° C.]: | 0.0916 |
| CCY-4-O2 | 7.00% | $\Delta\epsilon$ [1 kHz, 20° C.]: | −3.4 |
| CPY-2-O2 | 10.00% | $\epsilon_\parallel$ [1 kHz, 20° C.]: | 3.5 |
| CPY-3-O2 | 9.00% | $\epsilon_\perp$ [1 kHz, 20° C.]: | 7.0 |
| CCH-25 | 11.00% | $\gamma_1$ [mPa · s, 20° C.]: | 122 |
| CCH-34 | 11.00% | $V_0$ [V, 20° C.]: | 2.19 |
| PCH-301 | 8.00% | | |
| CCH-301 | 7.00% | | |
| CCP-3-1 | 7.00% | | |

Example 7

| | | | |
|---|---|---|---|
| CY-3-O2 | 21.00% | Clearing point [°C.]: | 79.5 |
| CCY-3-O2 | 8.50% | $\Delta n$ [589 nm, 20° C.]: | 0.0914 |
| CCY-4-O2 | 4.50% | $\Delta\epsilon$ [1 kHz, 20° C.]: | −3.3 |
| CPY-2-O2 | 10.50% | $\epsilon_\parallel$ [1 kHz, 20° C.]: | 3.5 |
| CPY-3-O2 | 10.00% | $\epsilon_\perp$ [1 kHz, 20° C.]: | 6.8 |
| CCH-25 | 12.00% | $\gamma_1$ [mPa · s, 20° C.]: | 118 |
| CCH-34 | 10.00% | $V_0$ [20° C.]: | 2.25 |
| PCH-301 | 4.50% | | |
| CCH-301 | 9.50% | | |
| CCP-3-1 | 9.50% | | |

Example 8

| | | | |
|---|---|---|---|
| CY-3-O2 | 24.00% | Clearing point [°C.]: | 79.5 |
| CY-5-O2 | 6.00% | $\Delta n$ [589 nm, 20° C.]: | 0.0937 |
| CCY-2-O2 | 7.00% | $\Delta\epsilon$ [1 kHz, 20° C.]: | −3.0 |
| CPY-3-O2 | 3.00% | $\epsilon_\parallel$ [1 kHz, 20° C.]: | 3.5 |
| CCP-3-3 | 8.50% | $\epsilon_\perp$ [1 kHz, 20° C.]: | 66 |
| CCP-3-1 | 9.00% | $\gamma_1$ [mPa · s, 20° C.]: | 119 |
| BCH-32 | 4.00% | $V_0$ [V, 20° C.]: | 2.32 |
| CCH-34 | 11.00% | LTS [cell, −20° C.]: | >1000 h |
| CCH-25 | 11.00% | | |
| PCH-301 | 4.50% | | |
| CLY-2-O4 | 4.00% | | |
| CLY-3-O2 | 4.00% | | |
| CLY-3-O3 | 4.00% | | |

Example 9

| | | | |
|---|---|---|---|
| CY-3-O2 | 24.50% | Clearing point [°C.]: | 79 |
| CLY-2-O4 | 5.00% | $\Delta n$ [589 nm, 20° C.]: | 0.0942 |

-continued

| | | | |
|---|---|---|---|
| CLY-3-O2 | 5.00% | Δε [1 kHz, 20° C.]: | −3.0 |
| CLY-3-O3 | 4.00% | ε∥ [1 kHz, 20° C.]: | 3.4 |
| CPY-2-O2 | 4.00% | ε⊥ [1 kHz, 20° C.]: | 6.4 |
| CPY-3-O2 | 9.50% | γ₁ [mPa·s, 20° C.]: | 107 |
| CCH-34 | 5.50% | V₀ [V, 20° C.]: | 2.33 |
| CCH-23 | 23.50% | LTS [bulk, −20° C.]: | >1000 h |
| CCP-3-3 | 5.00% | | |
| CCP-3-1 | 6.00% | | |
| BCH-32 | 6.50% | | |
| PCH-301 | 1.50% | | |

Example 10

| | | | |
|---|---|---|---|
| LY-3-O2 | 24.00% | Clearing point [° C.]: | 80 |
| CPY-3-O2 | 9.00% | Δn [589 nm, 20° C.]: | 0.1001 |
| PYP-2-3 | 2.50% | Δε [1 kHz, 20° C.]: | −2.9 |
| CCP-3-3 | 7.00% | ε∥ [1 kHz, 20° C.]: | 3.3 |
| CCP-3-1 | 7.00% | ε⊥ [1 kHz, 20° C.]: | 6.2 |
| BCH-32 | 4.50% | γ₁ [mPa·s, 20° C.]: | 105 |
| CCH-34 | 6.00% | V₀ [V, 20° C.]: | 2.46 |
| CCH-23 | 25.00% | LTS [bulk, −20° C.]: | >1000 h |
| CLY-2-O4 | 5.00% | | |
| CLY-3-O2 | 5.00% | | |
| CLY-3-O3 | 5.00% | | |

Example 11

| | | | |
|---|---|---|---|
| CY-3-O2 | 15.00% | Clearing point [° C.]: | 79.5 |
| CPY-3-O2 | 6.00% | Δn [589 nm, 20° C.]: | 0.0891 |
| PYP-2-3 | 5.00% | Δε [1 kHz, 20° C.]: | −3.6 |
| CCH-34 | 9.00% | ε∥ [1 kHz, 20° C.]: | 3.9 |
| CCH-23 | 20.00% | ε⊥ [1 kHz, 20° C.]: | 7.4 |
| CCP-3-1 | 9.00% | γ₁ [mPa·s, 20° C.]: | 111 |
| CCP-3-3 | 6.00% | V₀ [V, 20° C.]: | 2.13 |
| CLY-2-O4 | 5.00% | LTS [bulk, −20° C.]: | >1000 h |
| CLY-3-O2 | 4.00% | | |
| CLY-3-O3 | 4.00% | | |
| CK-3-F | 6.00% | | |
| CK-4-F | 5.00% | | |
| CK-5-F | 6.00% | | |

Example 12

| | | | |
|---|---|---|---|
| CY-3-O2 | 7.50% | Clearing point [° C.]: | 78 |
| CCY-4-O2 | 7.00% | Δn [589 nm, 20° C.]: | 0.0902 |
| CPY-2-O2 | 4.00% | Δε [1 kHz, 20° C.]: | −3.4 |
| CPY-3-O2 | 4.00% | ε∥ [1 kHz, 20° C.]: | 3.8 |
| PYP-2-3 | 4.50% | ε⊥ [1 kHz, 20° C.]: | 7.1 |
| CCH-34 | 11.00% | γ₁ [mPa·s, 20° C.] | 114 |
| CCH-25 | 11.00% | V₀ [V, 20° C.]: | 2.13 |
| CCH-301 | 7.00% | LTS [bulk, −30° C.]: | >1000 h |
| CCP-3-1 | 5.00% | | |
| PCH-301 | 12.00% | | |
| CLY-2-O4 | 5.00% | | |
| CLY-3-O2 | 5.00% | | |
| CLY-3-O3 | 5.00% | | |
| CK-3-F | 4.00% | | |
| CK-4-F | 4.00% | | |
| CK-5-F | 4.00% | | |

Example 13

| | | | |
|---|---|---|---|
| CY-3-O2 | 10.00% | Clearing point [20° C.]: | 79.5 |
| CK-3-F | 4.00% | Δn [589 nm, 20° C.]: | 0.0944 |
| CK-4-F | 4.00% | Δε [1 kHz, 20° C.]: | −3.0 |
| CK-5-F | 4.00% | ε∥ [1 kHz, 20° C.]: | 3.7 |
| PYP-2-3 | 1.50% | ε⊥ [1 kHz, 20° C.]: | 6.7 |
| CCY-3-O2 | 4.50% | γ₁ [mPa·s, 20° C.]: | 109 |
| CCY-4-O2 | 5.00% | V₀ [V, 20° C.]: | 2.28 |
| CPY-2-O2 | 8.00% | LTS [bulk, −20° C.]: | >1000 h |
| CPY-3-O2 | 9.50% | | |
| CCH-34 | 6.00% | | |
| CCH-23 | 22.00% | | |
| CCP-3-3 | 7.50% | | |
| BCH-32 | 6.00% | | |
| PCH-301 | 8.00% | | |

Example 14

| | | | |
|---|---|---|---|
| CCH-23 | 23.00% | Clearing point [° C.]: | 81 |
| CCH-34 | 8.00% | Δn [589 nm, 20° C.]: | 0.0905 |
| CCY-3-O2 | 6.00% | Δε [1 kHz, 20° C.]: | −3.8 |
| CCY-3-O3 | 6.00% | ε∥ [1 kHz, 20° C.]: | 3.9 |
| CPY-2-O2 | 8.00% | ε⊥ [1 kHz, 20° C.]: | 7.7 |
| CPY-3-O2 | 8.00% | V₀ [V, 20° C.]: | 2.08 |
| CY-3-O2 | 13.00% | | |
| PYP-2-3 | 3.00% | | |
| CK-3-F | 5.00% | | |
| CK-4-F | 5.00% | | |
| CK-5-F | 5.00% | | |
| CCP-3-1 | 10.00% | | |

Example 15

| | | | |
|---|---|---|---|
| PCH-302 | 13.00% | Clearing point [° C.]: | 75 |
| CCH-34 | 18.00% | Δn [589 nm, 20° C.]: | 0.0916 |
| CCH-25 | 3.50% | Δε [1 kHz, 20° C.]: | −2.7 |
| CCH-35 | 4.50% | ε∥ [1 kHz, 20° C.]: | 3.3 |
| CEY-3-O2 | 14.00% | ε⊥ [1 kHz, 20° C.]: | 6.0 |
| CEY-5-O2 | 13.50% | γ₁ [mPa·s, 20° C.]: | 125 |
| CCP-3-1 | 3.5% | V₀ [V, 20° C.]: | 2.60 |
| CCP-3-O1 | 3.00% | | |
| CCP-2-O2 | 3.00% | | |
| CCP-3-3 | 4.00% | | |
| CPY-3-O2 | 8.00% | | |
| CPY-5-O2 | 8.00% | | |
| CCY(F,Cl)-3-O2 | 4.00% | | |

Example 16

| | | | |
|---|---|---|---|
| COChrom-3-5 | 2.00% | Clearing point [° C.]: | 79.5 |
| COChrom-5-5 | 2.00% | Δn [589 nm, 20° C.]: | 0.0854 |
| CONaph-3-O4 | 2.00% | Δε [1 kHz, 20° C.]: | −3.6 |
| CONaph-5-O2 | 1.50% | ε∥ [1 kHz, 20° C.]: | 3.5 |
| CONaph-5-O3 | 2.00% | ε⊥ [1 kHz, 20° C.]: | 7.1 |
| CCOChrom-3-5 | 3.00% | γ₁ [mPa·s, 20° C.]: | 188 |
| CCOChrom-4-5 | 1.50% | | |
| CCONaph-2-O2 | 3.00% | | |
| CCONaph-5-O3 | 3.00% | | |
| CCONaph-5-O2 | 3.00% | | |

-continued

| | |
|---|---|
| CCONaph-3-O4 | 3.00% |
| PCH-301 | 14.00% |
| PCH-302 | 14.00% |
| CCH-35 | 8.00% |
| CCH-23 | 19.00% |
| CCH-34 | 8.00% |
| CCP-3-1 | 5.00% |
| CCP-3-3 | 6.00% |

Example 17

| | | | |
|---|---|---|---|
| CCH-23 | 20.00% | Clearing point [°C.]: | 78.5 |
| CCH-34 | 9.00% | Δn [589 nm, 20° C.]: | 0.0924 |
| PP-1-5 | 17.00% | Δε [1 kHz, 20° C.]: | −3.7 |
| CCP-3-1 | 10.00% | $\epsilon_{\parallel}$ [1 kHz, 20° C.]: | 3.5 |
| COYOICC-2-3 | 4.00% | $\epsilon_{\perp}$ [1 kHz, 20° C.]: | 7.2 |
| COYOIC-3-V | 8.00% | $\gamma_1$ [mPa·s, 20° C.]: | 165 |
| COYOICC-2-2 | 4.00% | | |
| CLOY-V-O2V | 13.00% | | |
| CCOY-V-O3V | 15.00% | | |

Example 18

| | | | |
|---|---|---|---|
| CY-3-O2 | 18.00% | Clearing point [° C.]: | 80.6 |
| CY-5-O2 | 10.00% | Δn [589 nm, 20° C.]: | 0.0948 |
| CCY-3-O2 | 7.00% | Δε [1 kHz, 20° C.]: | −3.1 |
| CPY-3-O2 | 9.00% | $\epsilon_{\parallel}$ [1 kHz, 20° C.]: | 3.4 |
| PYP-2-3 | 5.00% | $\epsilon_{\perp}$ [1 kHz, 20° C.]: | 6.5 |
| CLY-3-O2 | 8.00% | $K_1$ [pN, 20° C.] | 14.8 |
| CCP-3-3 | 17.00% | $K_3$ [pN, 20° C.] | 16.0 |
| CCH-34 | 4.00% | $V_0$ [V, 20° C.]: | 2.37 |
| CCH-23 | 22.00% | $\gamma_1$ [mPa·s, 20° C.]: | 122 |

Example 19

| | | | |
|---|---|---|---|
| CY-3-O2 | 18.00% | Clearing point [° C.]: | 79.7 |
| CY-5-O2 | 10.00% | Δn [589 nm, 20° C.]: | 0.1065 |
| CCY-3-O2 | 2.50% | Δε [1 kHz, 20° C.]: | −3.1 |
| CPY-3-O2 | 9.00% | $\epsilon_{\parallel}$ [1 kHz, 20° C.]: | 3.4 |
| PYP-2-3 | 12.00% | $\epsilon_{\perp}$ [1 kHz, 20° C.]: | 6.5 |
| CLY-3-O2 | 8.00% | $K_1$ [pN, 20° C.] | 15.0 |
| CCP-3-3 | 18.00% | $K_3$ [pN, 20° C.] | 15.8 |
| CCH-23 | 21.00% | $V_0$ [V, 20° C.]: | 2.38 |
| CCH-34 | 1.50% | $\gamma_1$ [mPa·s, 20° C.]: | 128 |

Example 20

| | | | |
|---|---|---|---|
| CY-3-O2 | 16.00% | Clearing point [° C.]: | 79.8 |
| CY-5-O2 | 11.00% | Δn [589 nm, 20° C.]: | 0.1063 |
| CCY-3-O2 | 5.00% | Δε [1 kHz, 20° C.]: | −3.0 |
| CPY-2-O2 | 8.00% | $\epsilon_{\parallel}$ [1 kHz, 20° C.]: | 3.4 |
| CPY-3-O2 | 8.00% | $\epsilon_{\perp}$ [1 kHz, 20° C.]: | 6.4 |
| PYP-2-3 | 10.50% | $K_1$ [pN, 20° C.] | 14.5 |
| CCP-3-3 | 18.50% | $K_3$ [pN, 20° C.] | 15.1 |
| CCH-34 | 4.00% | $V_0$ [V, 20° C.]: | 2.35 |
| CCH-23 | 19.00% | $\gamma_1$ [mPa·s, 20° C.]: | 127 |

Example 21

| | | | |
|---|---|---|---|
| CY-3-O2 | 9.50% | Clearing point [° C.]: | 75 |
| PY-3-O2 | 8.00% | Δn [589 nm, 20° C.]: | 0.1008 |
| CCY-3-O2 | 8.00% | Δε [1 kHz, 20° C.]: | −3.0 |
| CCY-4-O2 | 10.00% | $\epsilon_{\parallel}$ [1 kHz, 20° C.]: | 3.4 |
| CPY-2-O2 | 5.50% | $\epsilon_{\perp}$ [1 kHz, 20° C.]: | 6.4 |
| CPY-3-O2 | 10.00% | $K_1$ [pN, 20° C.] | 13.3 |
| CCH-34 | 10.00% | $K_3$ [pN, 20° C.] | 13.5 |
| CCH-23 | 22.00% | $V_0$ [V, 20° C.]: | 2.24 |
| PYP-2-3 | 6.50% | $\gamma_1$ [mPa·s, 20° C.]: | 106 |
| CCP-3-1 | 3.00% | | |
| PCH-301 | 7.50% | | |

Example 22

| | | | |
|---|---|---|---|
| PY-3-O2 | 11.00% | Clearing point [° C.]: | 79.5 |
| PY-3-O4 | 10.00% | Δn [589 nm, 20° C.]: | 0.1176 |
| CCY-3-O2 | 7.50% | Δε [1 kHz, 20° C.]: | −3.1 |
| CCY-4-O2 | 4.00% | $\epsilon_{\parallel}$ [1 kHz, 20° C.]: | 3.5 |
| CPY-2-O2 | 10.00% | $\epsilon_{\perp}$ [1 kHz, 20° C.]: | 6.5 |
| CPY-3-O2 | 10.00% | $K_1$ [pN, 20° C.] | 15.1 |
| CCH-34 | 6.00% | $K_3$ [pN, 20° C.] | 14.7 |
| CCH-23 | 22.00% | $V_0$ [V, 20° C.]: | 2.31 |
| PYP-2-3 | 4.00% | $\gamma_1$ [mPa·s, 20° C.]: | 121 |
| CCP-3-1 | 7.00% | | |
| BCH-32 | 5.00% | | |
| PCH-301 | 3.50% | | |

Example 23

For the preparation of a PS-VA mixture, 99.8% of the mixture in accordance with Example 1 are mixed with 0.2% of the polymerisable compound of the formula

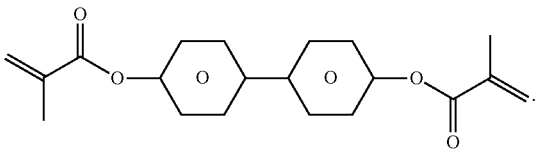

Example 24

For the preparation of a PS-VA mixture, 99.8% of the mixture in accordance with Example 15 are mixed with 0.2% of the polymerisable compound of the formula

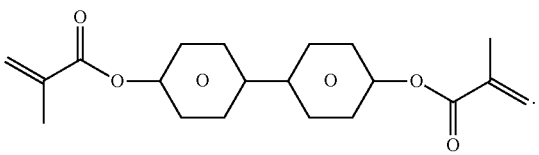

The invention claimed is:

1. Liquid-crystalline medium having negative dielectric anisotropy based on a mixture of polar compounds, which comprises:
at least one compound of the formula I

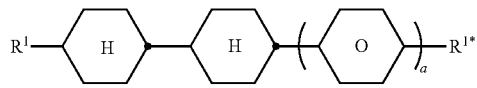

in which
R¹, R¹* each, independently of one another, denote an alkyl radical having 1-6 C atoms, and
a denotes 1;
and
at least one compound selected from the group of the compounds of the formulae IIB and IIC:

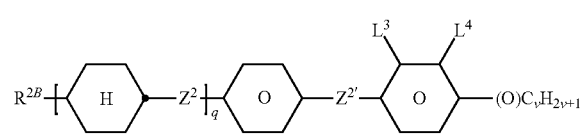

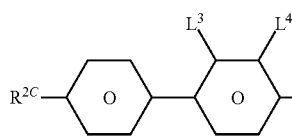

in which
$R^{2B}$ and $R^{2C}$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

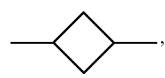

—C≡C—, —CF$_2$O—, —OCF$_2$—, —OC—O— or —O—CO— in such a way that O atoms are not linked directly to one another,
L³ and L⁴ each, independently of one another, denote F or Cl,
Z² and Z²' each, independently of one another, denote a single bond, —CH$_2$CH$_2$—, —CH=CH—, —CF$_2$O—, —OCF$_2$——CH$_2$O—, —OCH$_2$—, —COO—, —OCO—, —C$_2$F$_4$—, —CF=CF—, or —CH=CHCH$_2$O—,
q denotes 0, and
v denotes 1 to 6.

2. Liquid-crystalline medium according to claim 1, which additionally comprises one or more compounds of the formula III

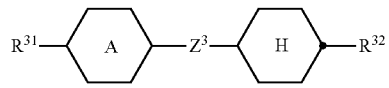

in which
R³¹ and R³² each, independently of one another, denote a straight-chain alkyl, alkoxyalkyl or alkoxy radical having up to 12 C atoms, and

denotes

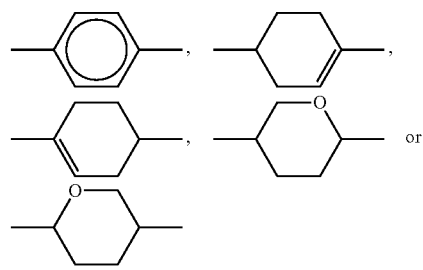

Z³ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, C$_4$H$_8$, —CF=CF—.

3. Liquid-crystalline medium according to claim 1, which comprises at least one compound of the formulae I-1 to I-2:

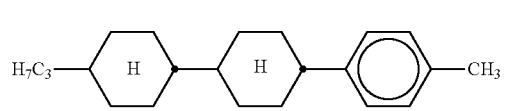

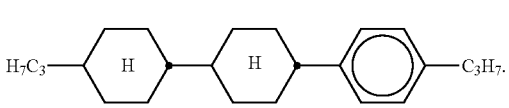

4. Liquid-crystalline medium according to claim 1, which additionally comprises one or more compounds of the formulae L-1 to L-11:

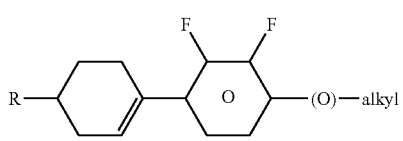

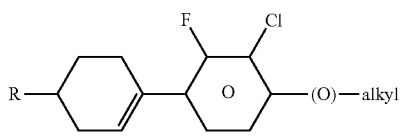

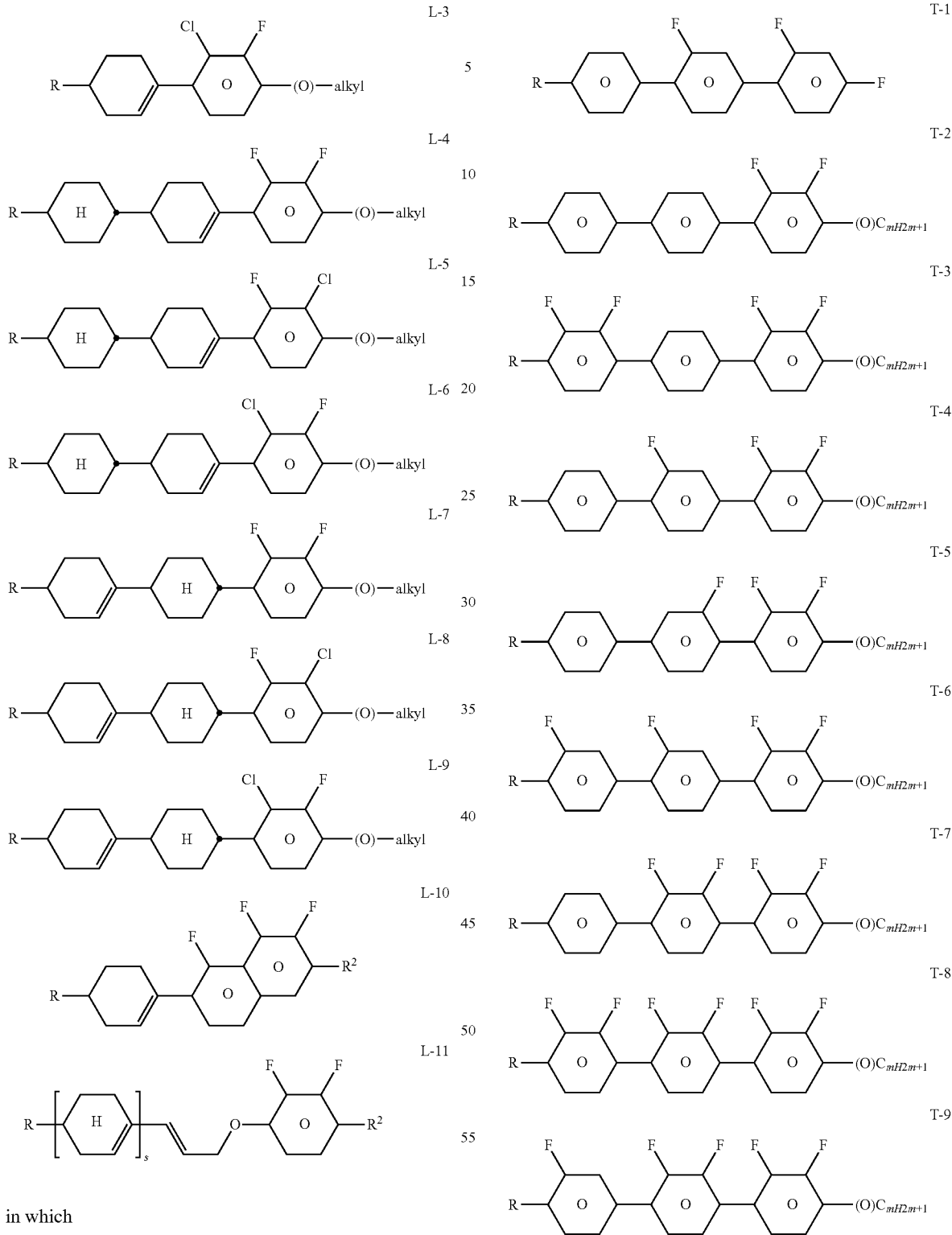
in which
R and $R^2$ each, independently of one another, have the meanings indicated for $R^{2B}$ in claim 1, and alkyl denotes an alkyl radical having 1-6 C atoms, and
s denotes 1 or 2.
5. Liquid-crystalline medium according to claim 1, which additionally comprises one or more terphenyls of the formulae T-1 to T-20:

-continued
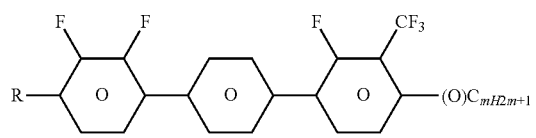
T-11
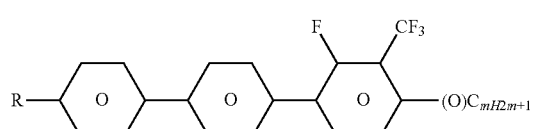
T-12
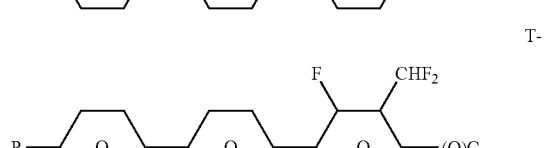
T-13
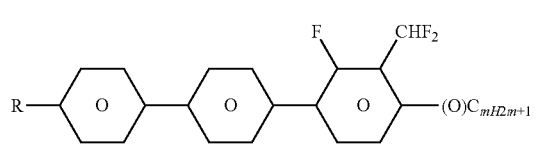
T-14
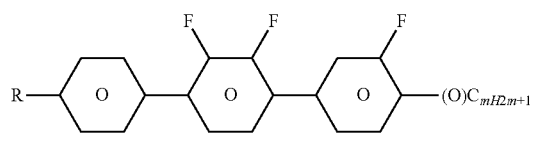
T-15
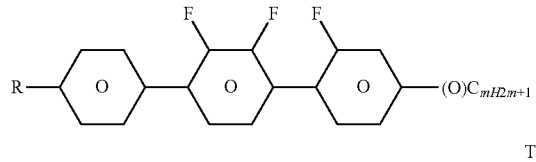
T-16
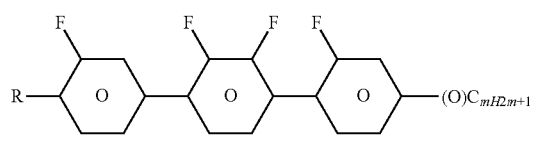
T-17
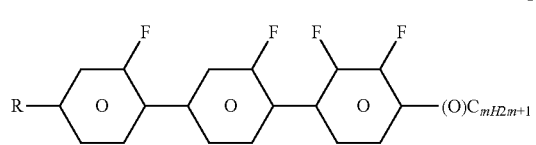
T-18
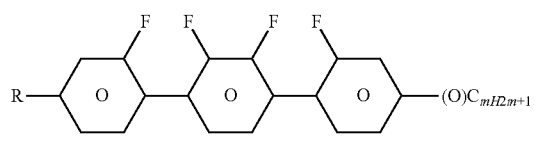
T-19
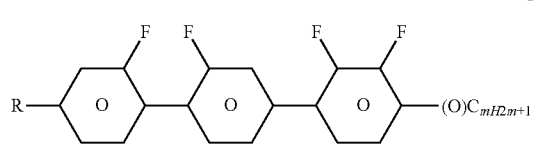
T-20
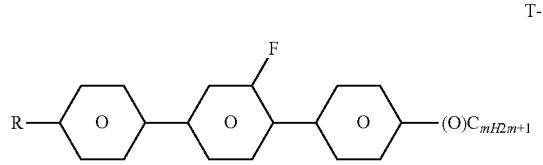
in which
R' denotes a straight-chain alkyl or alkoxy radical having 1-7 C atoms, and
m denotes 1-6.
6. Liquid-crystalline medium according to claim 1, which additionally comprises one or more compounds of the formulae O-1 to O-18:
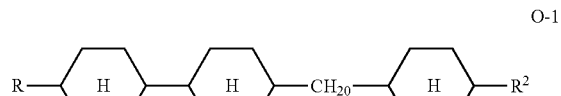
O-1
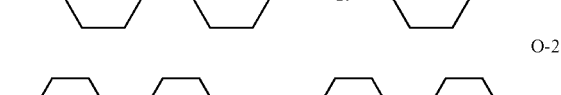
O-2
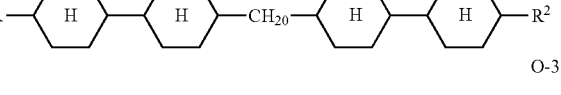
O-3
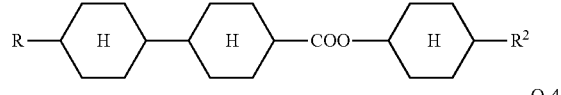
O-4
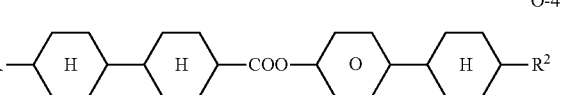
O-5
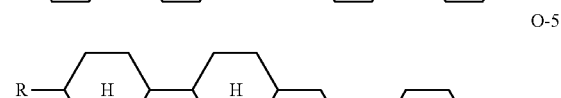
O-6
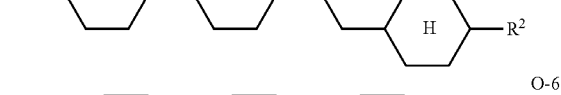
O-7
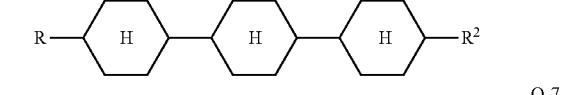
O-8
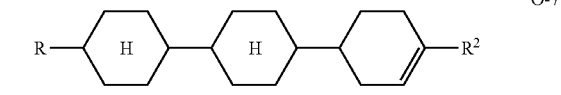
O-9
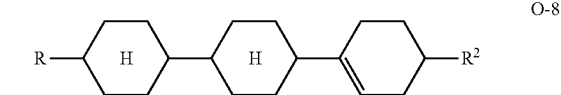
O-10
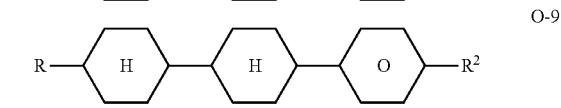
O-11
O-12

-continued

O-13

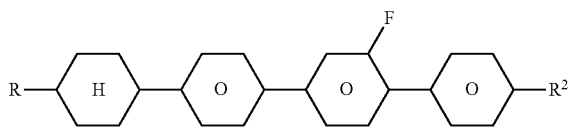

O-14

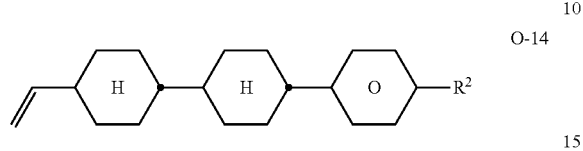

O-15

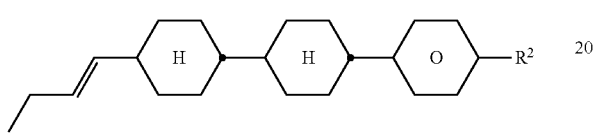

O-16

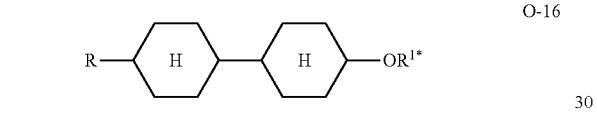

O-17

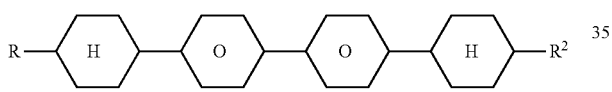

O-18

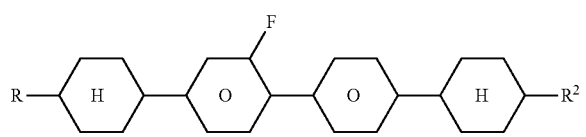

in which

R and $R^2$ each, independently of one another, have the meanings indicated for $R^{2B}$ in claim 1.

7. Liquid-crystalline medium according to claim 1, which additionally comprises one or more indane compounds of the formula In In

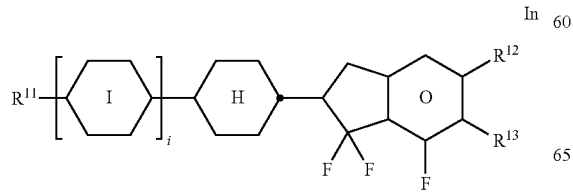

in which $R^{11}, R^{12}, R^{13}$ denote a straight-chain alkyl, alkoxy, alkoxyalkyl or alkenyl radical having 1-5 C atoms, $R^{12}$ and $R^{13}$ additionally denote halogen,

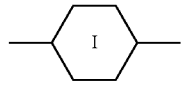

denotes

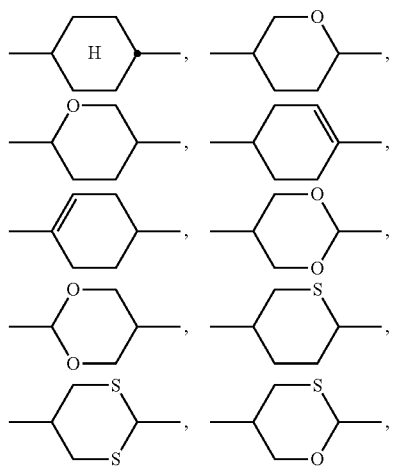

i denotes 0, 1 or 2.

8. Liquid-crystalline medium according to claim 1, wherein the proportion of compounds of the formula I in the mixture as a whole is $\geq 3\%$ by weight.

9. Process for the preparation of a liquid-crystalline medium according to claim 1, wherein at least one compound of the formula I is mixed with at least one compound selected from the group of the compounds of the formulae IIB and IIC and, optionally, at least one further liquid-crystalline compound, and additives are optionally added.

10. A method which comprises generating an electro-optical effect in an electro-optical display, wherein said display contains a liquid-crystalline medium according to claim 1.

11. Electro-optical display having active-matrix addressing, wherein said display contains, as dielectric, a liquid-crystalline medium according to claim 1.

12. Electro-optical display according to claim 11, wherein said display is a VA, PS-VA, PALC, FFS or IPS display.

13. Liquid-crystalline medium according to claim 1, which additionally comprises one or more compounds of the formulae IIA:

IIA

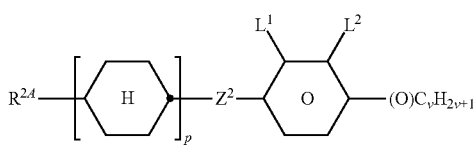

in which $R^{2A}$ has one of the meanings for $R^{2B}$ in claim 1,
$L^1$ and $L^2$ each, independently of one another, denote F or Cl,
$Z^2$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, or —CH=CHCH$_2$O—,
p denotes 1 or 2, and
v denotes 1 to 6.

14. Liquid-crystalline medium according to claim 1, which additionally comprises one or more compounds of the formulae IIB:

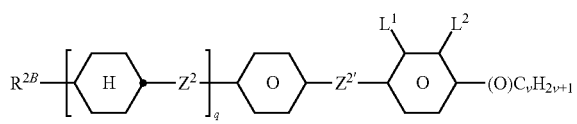

IB wherein the variables are as defined in claim 1 except that q is 1.

* * * * *

UNITED STATES PATENT AND TRADEMARK OFFICE
CERTIFICATE OF CORRECTION

PATENT NO. : 8,399,073 B2
APPLICATION NO. : 13/141132
DATED : March 19, 2013
INVENTOR(S) : Melanie Klasen-Memmer et al.

It is certified that error appears in the above-identified patent and that said Letters Patent is hereby corrected as shown below:

In the Claims

Claim 5, col. 86, line 1-65, and col. 87, line 1-65, should be deleted as shown on the attached pages.

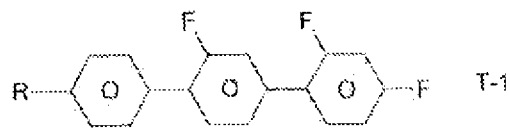

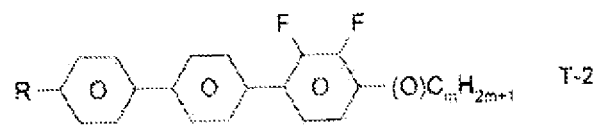

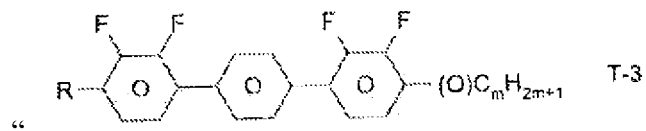

Signed and Sealed this
Eleventh Day of February, 2014

Michelle K. Lee
*Deputy Director of the United States Patent and Trademark Office*

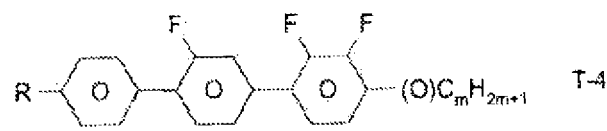 T-4
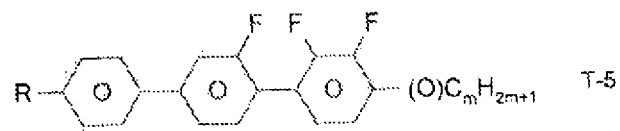 T-5
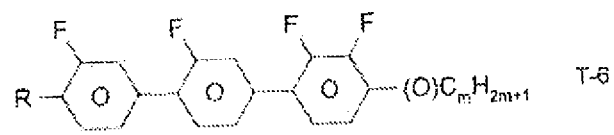 T-6
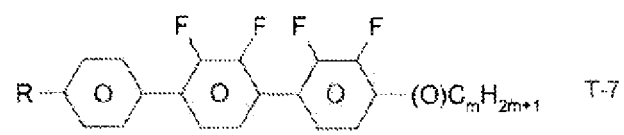 T-7
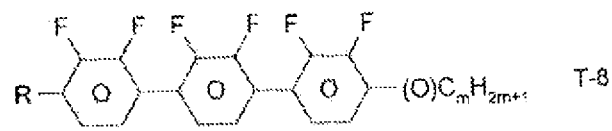 T-8
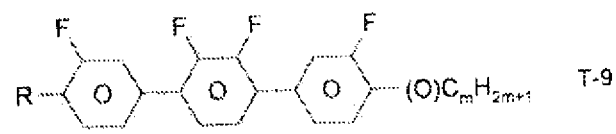 T-9
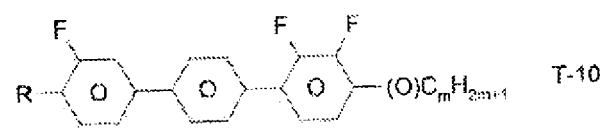 T-10

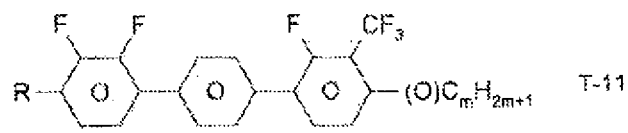 T-11
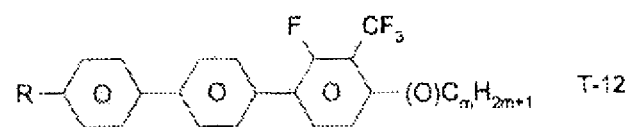 T-12
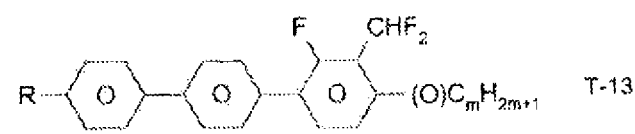 T-13
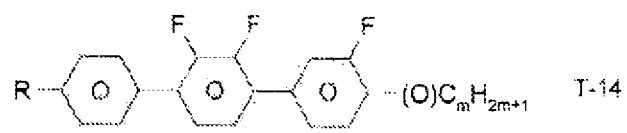 T-14
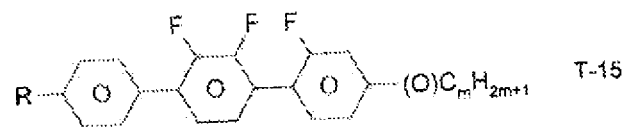 T-15
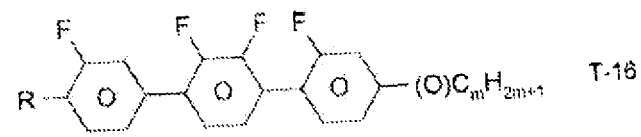 T-16
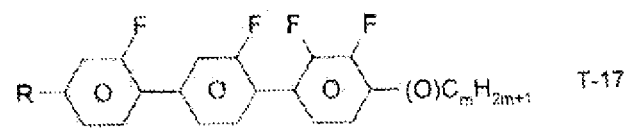 T-17

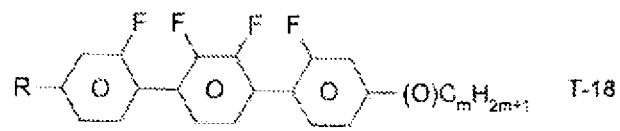 T-18
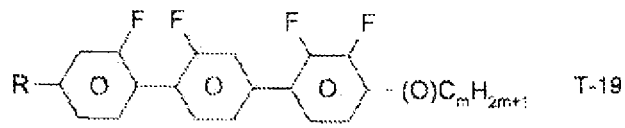 T-19
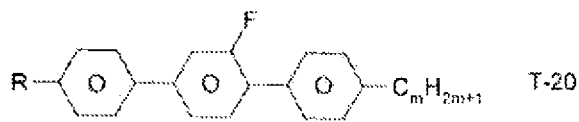 T-20
"
Claim 5, col. 86, line 1-65, and col. 87, line 1-65, should read as shown on the attached pages.
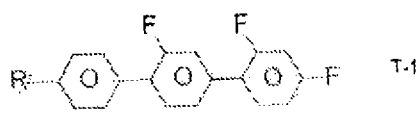 T-1
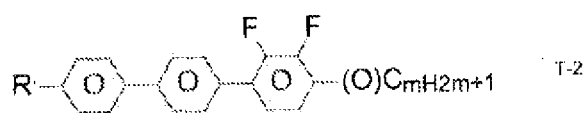 T-2
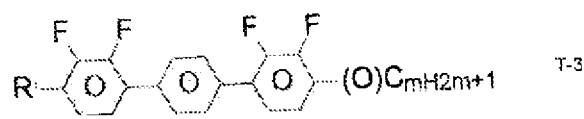 T-3
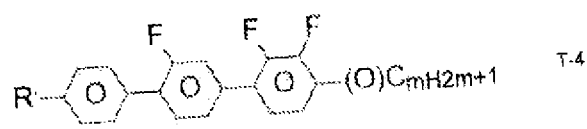 T-4

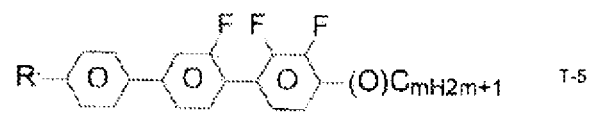
T-5
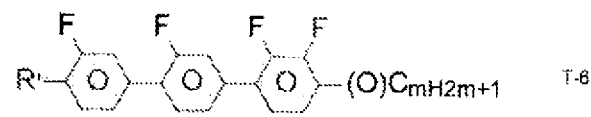
T-6
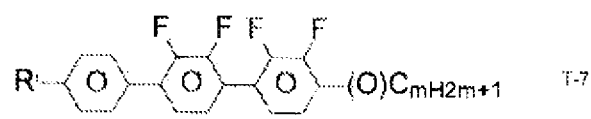
T-7
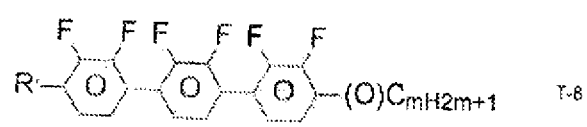
T-8
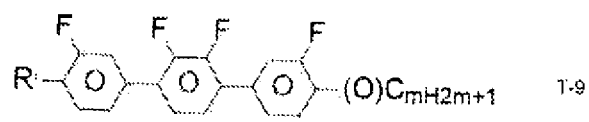
T-9
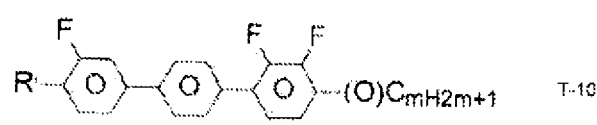
T-10

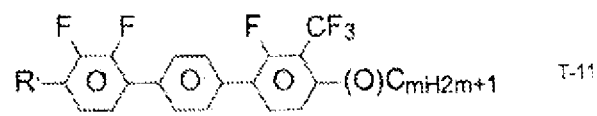
T-11
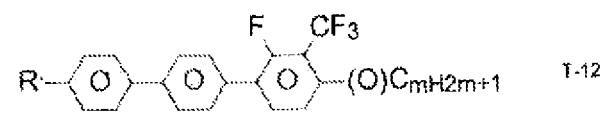
T-12
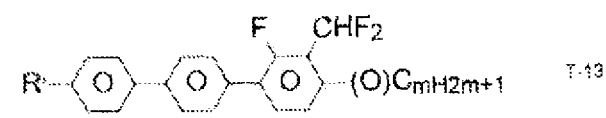
T-13
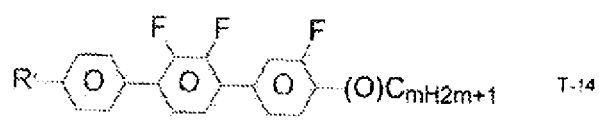
T-14
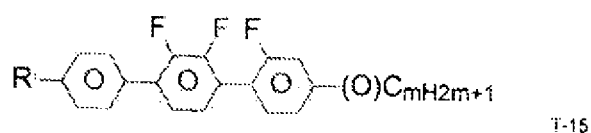
T-15
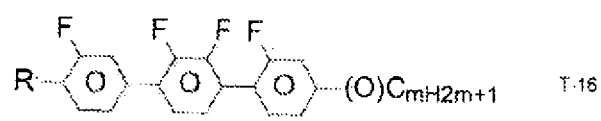
T-16

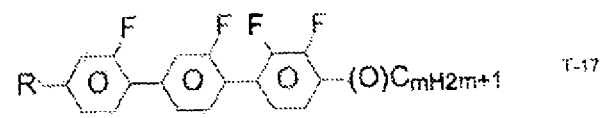 T-17
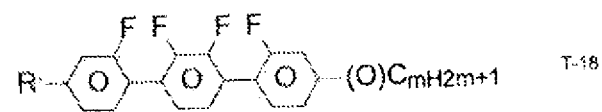 T-18
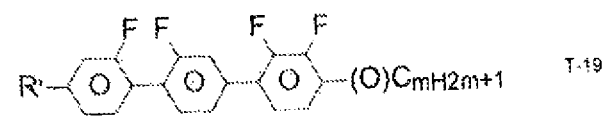 T-19
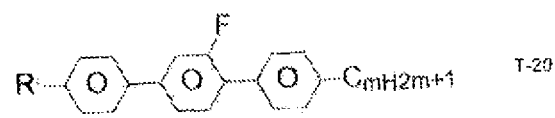 T-20